United States Patent
Lee et al.

(10) Patent No.: US 11,368,947 B2
(45) Date of Patent: Jun. 21, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Taewoo Lee, Sakai (JP); Shoichi Suzuki, Sakai (JP); Wataru Ouchi, Sakai (JP); Liqing Liu, Sakai (JP); Tomoki Yoshimura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 88 days.

(21) Appl. No.: 16/759,982

(22) PCT Filed: Oct. 31, 2018

(86) PCT No.: PCT/JP2018/040502
§ 371 (c)(1),
(2) Date: Apr. 28, 2020

(87) PCT Pub. No.: WO2019/088168
PCT Pub. Date: May 9, 2019

(65) Prior Publication Data
US 2020/0337027 A1 Oct. 22, 2020

(30) Foreign Application Priority Data
Nov. 1, 2017 (JP) .............................. JP2017-211574

(51) Int. Cl.
*H04W 72/04* (2009.01)

(52) U.S. Cl.
CPC ................................ *H04W 72/042* (2013.01)

(58) Field of Classification Search
CPC ... H04W 72/042; H04W 72/04; H04W 76/19; H04W 76/27; H04W 24/08
See application file for complete search history.

(56) References Cited

U.S. PATENT DOCUMENTS

| 2018/0183551 A1* | 6/2018 | Chou | H04W 72/042 |
| 2019/0089486 A1* | 3/2019 | Kim | H04W 72/042 |

(Continued)

OTHER PUBLICATIONS

3GPP TS 38.211 V1.0.0 (Sep. 2017) 3rd Generation Partnership Project; Technical Specification Group Radio Access Network; NR; Physical channels and modulation (Release 15).

(Continued)

*Primary Examiner* — Chi Ho A Lee
(74) *Attorney, Agent, or Firm* — ScienBiziP, P.C.

(57) ABSTRACT

A terminal apparatus includes a receiver configured to receive a first Physical Downlink Control Channel (PDCCH) including a first downlink Bandwidth part Index Field (BIF) based on a PDCCH candidate of a first search space in a first serving cell and receive a second PDCCH including a second downlink BIF based on a PDCCH candidate in a second search space in the first serving cell, and
a higher layer processing unit configured to activate any downlink bandwidth part (BWP) of a first set of downlink BWPs in the first serving cell based on information indicated by the first downlink BIF and activate a downlink BWP of a second set of downlink BWPs in a second serving cell based on information indicated by the second downlink BIF.

6 Claims, 13 Drawing Sheets

(56) References Cited

U.S. PATENT DOCUMENTS

| | | | | |
|---|---|---|---|---|
| 2019/0132109 | A1* | 5/2019 | Zhou | H04W 76/38 |
| 2019/0132824 | A1* | 5/2019 | Jeon | H04W 28/20 |
| 2019/0132845 | A1* | 5/2019 | Babaei | H04W 72/042 |
| 2019/0132857 | A1* | 5/2019 | Babaei | H04W 72/042 |
| 2020/0154467 | A1* | 5/2020 | Gong | H04W 24/08 |
| 2020/0177306 | A1* | 6/2020 | Choi | H04L 5/0094 |
| 2020/0196285 | A1* | 6/2020 | Zhuang | H04W 72/042 |
| 2021/0075581 | A1* | 3/2021 | Takeda | H04W 72/042 |
| 2021/0076445 | A1* | 3/2021 | Tsai | H04W 76/19 |
| 2021/0167930 | A1* | 6/2021 | Jeon | H04W 76/27 |

OTHER PUBLICATIONS

3GPP TS 38.212 V1.0.0 (Sep. 2017) 3rd Generation Partnership Project; Technical Specification Group Radio Access Network; NR; Multiplexing and channel coding (Release 15).
3GPP TS 38.213 V1.0.1 (Sep. 2017) 3rd Generation Partnership Project; Technical Specification Group Radio Access Network; NR; Physical layer procedures for control (Release 15).
3GPP TS 38.214 V1.0.1 (Sep. 2017) 3rd Generation Partnership Project; Technical Specification Group Radio Access Network; NR; Physical layer procedures for data (Release 15).
Nokia et al., "Cell and BWP relation", R2-1711065, 3GPP TSG-RAN WG2 #99bis, Prague, Czech Republic, Oct. 9-13, 2017 (Oct. 8, 2017).
Nokia et al., "On remaining aspects of BWPs", R1-1718607, 3GPP TSG-RAN WG1 Meeting #90bis, Prague, CZ, Oct. 9-13, 2017 (Oct. 2, 2017).
Huawei et al, "Other issues on NR CA and DC including SRS switching and SUL", R1-1717080, 3GPP TSG RAN WG1 Meeting #90bis, Prague, Czech Republic, Oct. 9-13, 2017 (Oct. 8, 2017).
Samsung, "Cross-Carrier Scheduling and HARQ-ACK Feedback", R1-1713652, 3GPP TSG RAN WG1 #90, Prague, Czech Republic, Aug. 21-25, 2017.

* cited by examiner

| VALUE OF CIF | VALUE OF DOWNLINK BIF | SERVING CELL | CORRESPONDING DOWNLINK BWP | SEARCH SPACE |
|---|---|---|---|---|
| 0 | 0 | 900 | BWP901 | 902 |
| 0 | 1 | 900 | BWP904 | 902 |
| 1 | 0 | 950 | BWP951 | 909 |
| 1 | 1 | 950 | BWP954 | 909 |

FIG. 10

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-211574 filed on Nov. 1, 2017, the contents of which are incorporated herein by reference.

BACKGROUND ART

A radio access method and a radio network for cellular mobile communications (hereinafter, referred to as "Long Term Evolution (LTE: registered trademark)," or "Evolved Universal Terrestrial Radio Access (EUTRA)") have been studied in the 3rd Generation Partnership Project (3GPP). Further, in 3GPP, a new radio access method (hereinafter referred to as "New Radio (NR)") is being studied (NPLs 1, 2, 3, 4). In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

In NR, a set of downlink BWP (bandwidth part) and uplink BWP is configured for one serving cell (NPL 3). The terminal apparatus receives PDCCH and PDSCH in the downlink BWP.

CITATION LIST

Non Patent Literature

NPL 1: "3GPP TS 38.211 V1.0.0 (2017-09), NR; Physical channels and modulation," Sep. 7, 2017.
NPL 2: "3GPP TS 38.212 V1.0.0 (2017-09), NR; Multiplexing and channel coding," Sep. 7, 2017.
NPL 3: "3GPP TS 38.213 V1.0.1 (2017-09), NR; Physical layer procedures for control," Sep. 7, 2017.
NPL 4: "3GPP TS 38.214 V1.0.1 (2017-09), NR; Physical layer procedures for data," Sep. 7, 2017.

SUMMARY OF INVENTION

Technical Problem

One aspect of the present invention provides a terminal apparatus capable of efficiently receiving downlink transmission, a communication method used for the terminal apparatus, a base station apparatus capable of efficiently performing downlink transmission, and a communication method used for the base station apparatus.

Solution to Problem (1) According to some aspects of the present invention, the following measures are provided. That is, a first aspect of the present invention is a terminal apparatus including a receiver configured to receive a first Physical Downlink Control Channel (PDCCH) including a first downlink Bandwidth part Index Field (BIF) based on a PDCCH candidate of a first search space in a first serving cell and receive a second PDCCH including a second downlink BIF based on a PDCCH candidate in a second search space in the first serving cell, and a higher layer processing unit configured to activate a downlink bandwidth part (BWP) of a first set of downlink BWPs in the first serving cell based on information indicated by the first downlink BIF and activate a downlink BWP of a second set of downlink BWPs in a second serving cell based on information indicated by the second downlink BIF.

(2) A second aspect of the present invention is a terminal apparatus in which a carrier indicator field (CIF) included in the first PDCCH is set to a first value, and the CIF included in the second PDCCH is set to a second value.

(3) A third aspect of the present invention is a terminal apparatus in which, the receiver receives, in a case that the first PDCCH is detected, a first PDSCH in a downlink BWP corresponding to the value set to the downlink BIF included in the first PDCCH, and in a case that the second PDCCH is detected, a second PDSCH in a downlink BWP corresponding to the value set to the downlink BIF included in the second PDCCH, a band allocated for the first PDSCH is provided based on at least a Resource Allocation Field (RAF) included in the first PDCCH, and a band allocated for the second PDSCH is provided based on at least a Resource Allocation Field (RAF) included in the second PDCCH.

(4) A fourth aspect of the present invention is a base station apparatus including a transmitter configured to transmit a first Physical Downlink Control Channel (PDCCH) including a first downlink Bandwidth part Index Field (BIF) based on a PDCCH candidate of a first search space in a first serving cell and transmit a second PDCCH including a second downlink BIF based on a PDCCH candidate in a second search space in the first serving cell, and a higher layer processing unit configured to activate a downlink bandwidth part (BWP) of a first set of downlink BWPs in the first serving cell based on information indicated by the first downlink BIF and activate a downlink BWP of a second set of downlink BWPs in a second serving cell based on information indicated by the second downlink BIF.

(5) A fifth aspect of the present invention is a base station apparatus in which a carrier indicator field (CIF) included in the first PDCCH is set to a first value, and the CIF included in the second PDCCH is set to a second value.

(6) A sixth aspect of the present invention is a base station apparatus in which, the transmitter transmits, in a case that the first PDCCH is detected, a first PDSCH in a downlink BWP corresponding to the value set for the downlink BIF included in the first PDCCH, and in a case that the second PDCCH is detected, a second PDSCH in a downlink BWP corresponding to the value set for the downlink BIF included in the second PDCCH, a band allocated for the first PDSCH is provided based on at least a Resource Allocation Field (RAF) included in the first PDCCH, and a band allocated for the second PDSCH is provided based on at least a Resource Allocation Field (RAF) included in the second PDCCH.

(7) A seventh aspect of the present invention is a communication method used for a terminal apparatus, the communication method including receiving a first Physical Downlink Control Channel (PDCCH) including a first downlink Bandwidth part Index Field (BIF) based on a PDCCH candidate of a first search space in a first serving cell, receiving a second PDCCH including a second downlink BIF based on a PDCCH candidate in a second search space in the first serving cell, activating a downlink bandwidth part (BWP) of a first set of downlink BWPs in the first serving cell based on information indicated by the first downlink BIF, and activating a downlink BWP of a second set of downlink BWPs in a second serving cell based on information indicated by the second downlink BIF.

(8) An eighth aspect of the present invention is a communication method used for a base station apparatus, the communication method including transmitting a first Physical Downlink Control Channel (PDCCH) including a first downlink Bandwidth part Index Field (BIF) based on a PDCCH candidate of a first search space in a first serving cell, transmitting a second PDCCH including a second downlink BIF based on a PDCCH candidate in a second search space in the first serving cell, activating a downlink bandwidth part (BWP) of a first set of downlink BWPs in the first serving cell based on information indicated by the first downlink BIF, and activating a downlink BWP of a second set of downlink BWPs in a second serving cell based on information indicated by the second downlink BIF.

Advantageous Effects of Invention

According to one aspect of the present invention, the terminal apparatus can efficiently receive downlink transmission. In addition, the base station apparatus can efficiently perform downlink transmission.

BRIEF DESCRIPTION OF DRAWINGS

FIG. 10 is a table illustrating mapping between a CIF value, a downlink BIF value, a serving cell, and a downlink BWP according to the present embodiment.

DESCRIPTION OF EMBODIMENTS

Embodiments of the present invention will be described below.

Figure 1:
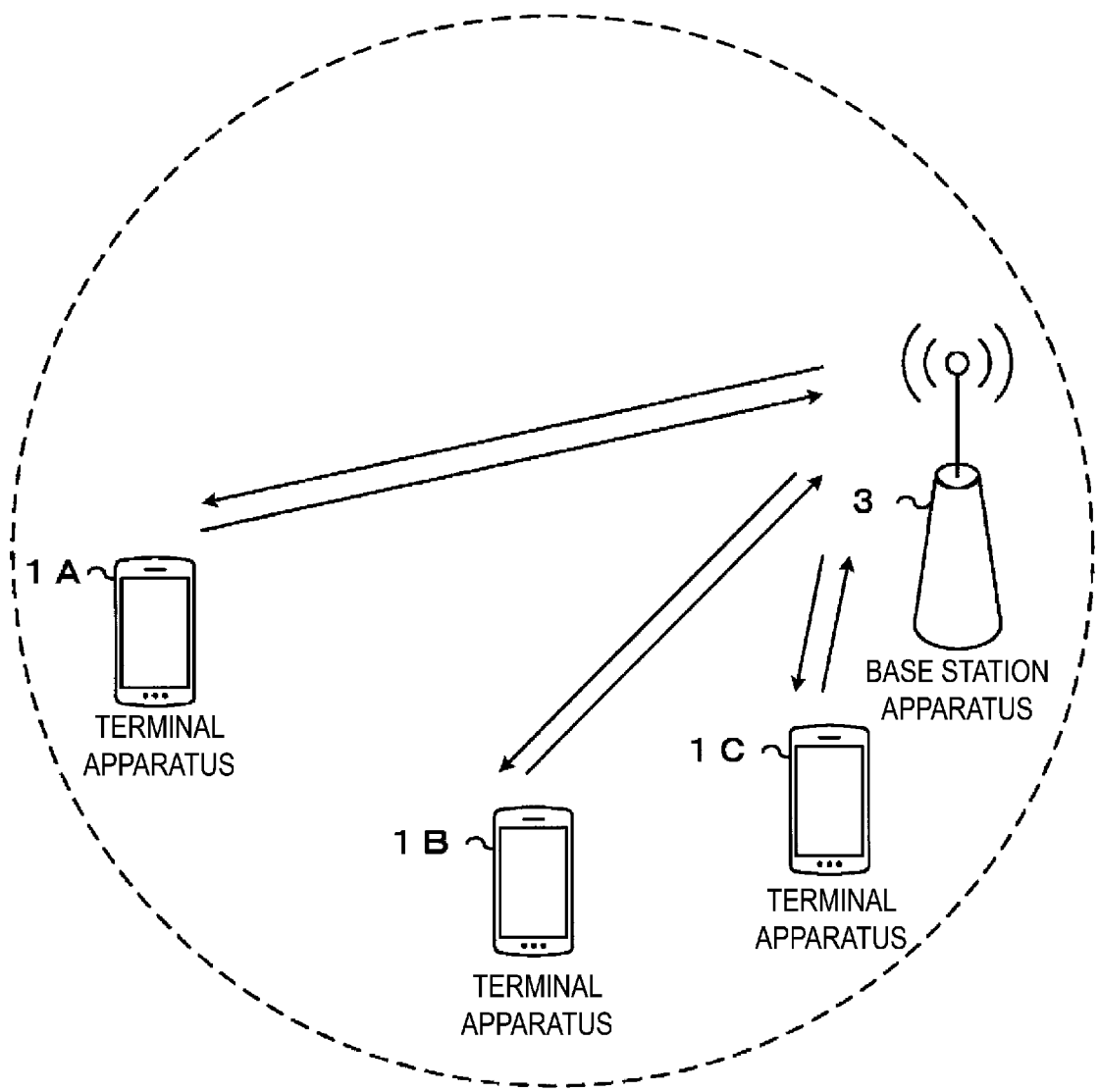
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for transmitting CSI (Channel State Information) of downlink and/or HARQ-ACK (Hybrid Automatic Repeat reQuest). The CSI, as well as the HARQ-ACK, is uplink control information (UCI).

The PUSCH is used for transmitting uplink data (Transport block, Uplink-Shared CHannel (UL-SCH)), the CSI of downlink, and/or the HARQ-ACK. The CSI, as well as the HARQ-ACK, is uplink control information (UCI). The terminal apparatus 1 may transmit the PUSCH based on detection of PDCCH (Physical Downlink Control Channel) including uplink grant.

The PRACH is used to transmit a random access preamble.

The following uplink physical signal is used in the uplink radio communication. The uplink physical signal is not used for transmitting information output from the higher layer, but is used by the physical layer.

Demodulation Reference Signal (DMRS)

The DMRS relates to transmission of the PUSCH or the PUCCH. The DMRS may be time-multiplexed with the PUSCH. The base station apparatus 3 may use the DMRS in order to perform channel compensation of the PUSCH.

The following downlink physical channels are used for downlink radio communication from the base station apparatus 3 to the terminal apparatus 1. The downlink physical channels are used for transmitting information output from the higher layer.

Physical Downlink Control Channel (PDCCH)
Physical Downlink Control Channel (PDSCH)

The PDCCH is used to transmit downlink control information (DCI). The downlink control information is also referred to as DCI format. The downlink control information includes an uplink grant. The uplink grant is used for scheduling of a single PUSCH in a single cell. The uplink grant may be used for scheduling multiple PUSCHs in multiple slots in a single cell. The uplink grant may be used for scheduling a single PUSCH in multiple slots in a single cell.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

Hereinafter, carrier aggregation will be described.

According to the present embodiment, one or multiple serving cells are configured for the terminal apparatus 1. A technology that allows the terminal apparatus 1 to perform communication via the multiple serving cells is referred to as cell aggregation or carrier aggregation. The present invention may be applied to each of the multiple serving cells configured for the terminal apparatus 1. Furthermore, the present invention may be applied to some of the multiple serving cells configured. The multiple serving cells includes at least one primary cell. Here, the multiple serving cells may include one or multiple secondary cells.

Time Division Duplex (TDD) and/or Frequency Division Duplex (FDD) may be applied to a radio communication system according to the present embodiment. In a case of a cell aggregation, serving cells to which TDD is applied and serving cells to which FDD is applied may be aggregated.

The multiple serving cells configured includes one primary cell and one or multiple secondary cells. The primary cell is a serving cell in which an initial connection establishment procedure has been performed, a serving cell in which a connection re-establishment procedure has been initiated, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

A set of downlink BWPs (bandwidth parts) may be configured for each serving cell. The set of downlink BWPs may include one or multiple downlink BWPs. The downlink BWP included in the set of downlink BWPs for the serving cell is also referred to as the downlink BWP in the serving cell or the downlink BWP included in the serving cell. One physical channel is transmitted in one downlink BWP out of multiple downlink BWPs. One downlink BWP may include multiple consecutive physical resource blocks in the frequency domain.

A configuration of the radio frame according to the present embodiment will be described below.

Figure 2:
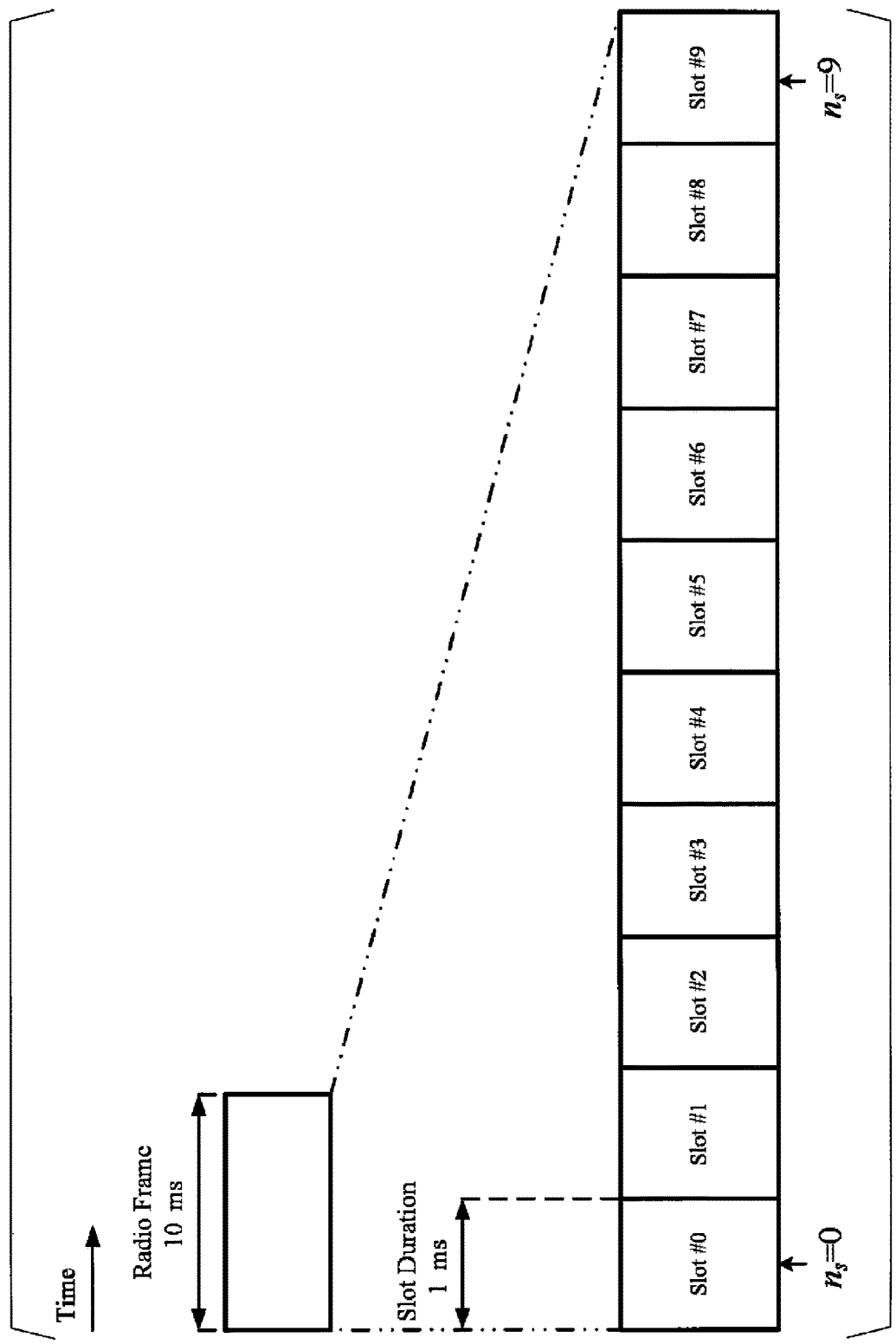
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Furthermore, each of the radio frames may include ten slots. Each of the slots may be 1 ms in length.

Figure 3:
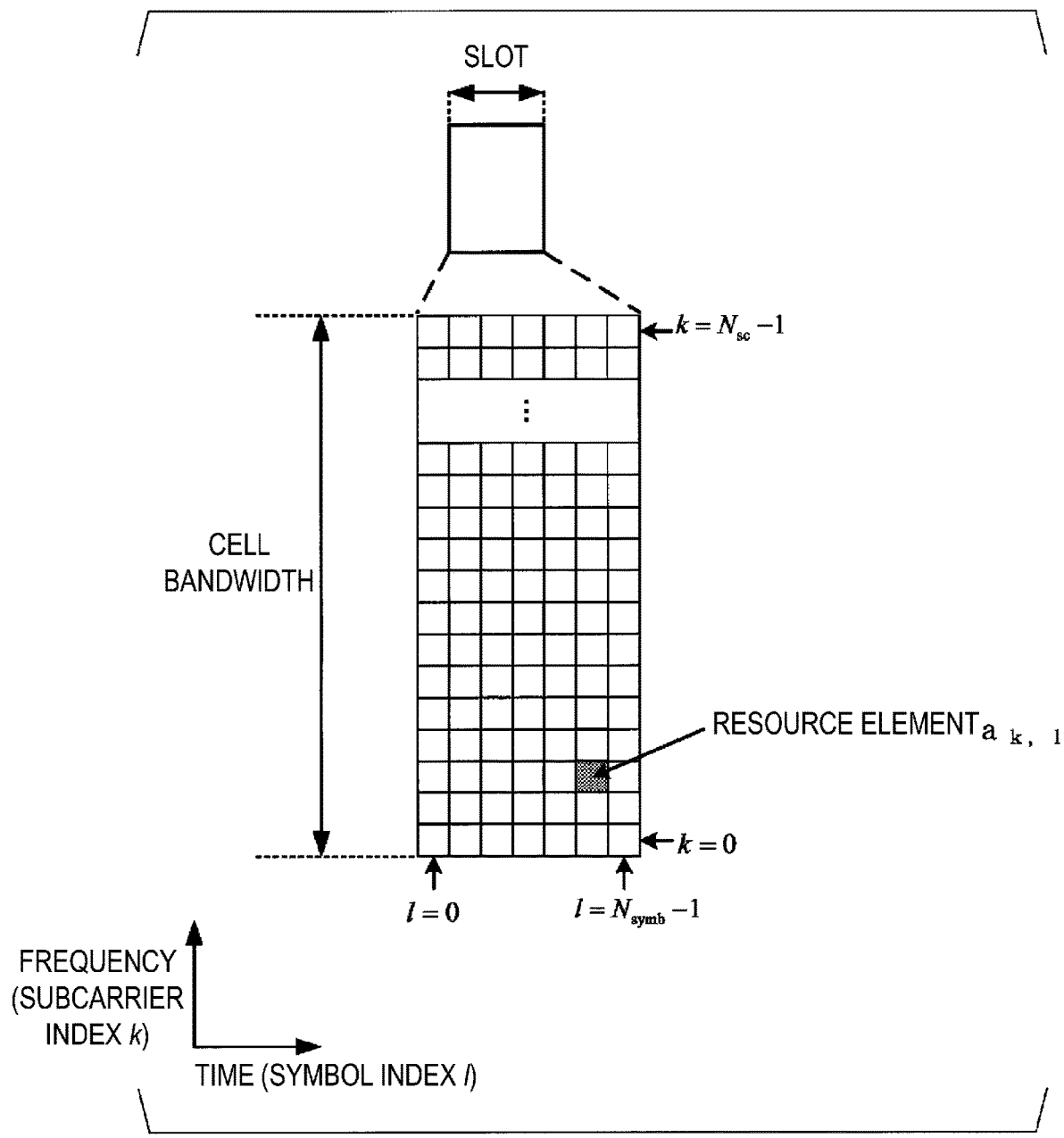
FIG. 3 is a diagram illustrating a schematic configuration of a downlink slot according to the present embodiment.

An example configuration of a slot according to the present embodiment will be described below. FIG. 3 is a diagram illustrating a schematic configuration of a downlink slot according to the present embodiment. FIG. 3 illustrates a configuration of a downlink slot in a cell. In FIG. 3, the horizontal axis is a time axis, and the vertical axis is a frequency axis. The downlink slot may include $N^{DL}_{symb}$ OFDM symbols. Hereinafter, according to the present embodiment, a case where the downlink slot includes an OFDM symbol will be described.

In FIG. 3, l is an OFDM symbol number/index, and k is a subcarrier number/index. The physical signal or the physical channel transmitted in each of the slots is represented by a resource grid. In downlink, the resource grid is defined by multiple subcarriers and multiple OFDM symbols. Each element in the resource grid is referred to as a resource element. The resource element is represented by a subcarrier number/index k and an OFDM symbol number/index l.

The downlink slot includes the multiple OFDM symbols l (l=0, 1, . . . , $N^{DL}_{symb}$) in the time domain. For a normal Cyclic Prefix (CP) in the downlink, $N^{DL}_{symb}$ may be 7 or 14. For an extended CP in the downlink, $N^{DL}_{symb}$ may be 6 or 12.

The terminal apparatus 1 receives the parameter DL-CyclicPrefixLength of the higher layer indicating the CP length in the downlink from the base station apparatus 3. The base station apparatus 3 may broadcast, in the cell, system information including the parameter DL-CyclicPrefix-Length of the higher layer corresponding to the cell.

The downlink slot includes the multiple subcarriers k (k=0, 1, . . . , $N^{DL}_{RB} \cdot N^{RB}_{SC}$) in the frequency domain. $N^{DL}_{RB}$ is a downlink bandwidth configuration for the serving cell represented by a multiple of $N^{RB}_{SC}$. $N^{RB}_{SC}$ is a (physical) resource block size in the frequency domain represented by the number of subcarriers. The subcarrier spacing Δf may be 15 kHz. The $N^{RB}_{SC}$ may be 12. The (physical) resource block size in the frequency domain may be 180 kHz.

One physical resource block is defined by $N^{DL}_{symb}$ consecutive OFDM symbols in the time domain and $N^{RB}_{SC}$ consecutive subcarriers in the frequency domain. Hence, one physical resource block includes ($N^{DL}_{symb} \cdot N^{RB}_{SC}$) resource elements. One physical resource block may correspond to one slot in the time domain. The physical resource blocks may be numbered $n_{PRB}$ (0, 1, . . . , $N^{DL}_{RB}-1$) in an ascending order of frequencies in the frequency domain.

The uplink slot according to the present embodiment includes multiple OFDM symbols and/or SC-FDMA symbols. Since the slot configuration of the uplink according to the present embodiment is basically the same as the slot configuration of the downlink, the description of the configuration of the uplink slot will be omitted.

Configurations of apparatuses according to the present embodiment will be described below.

Figure 4:
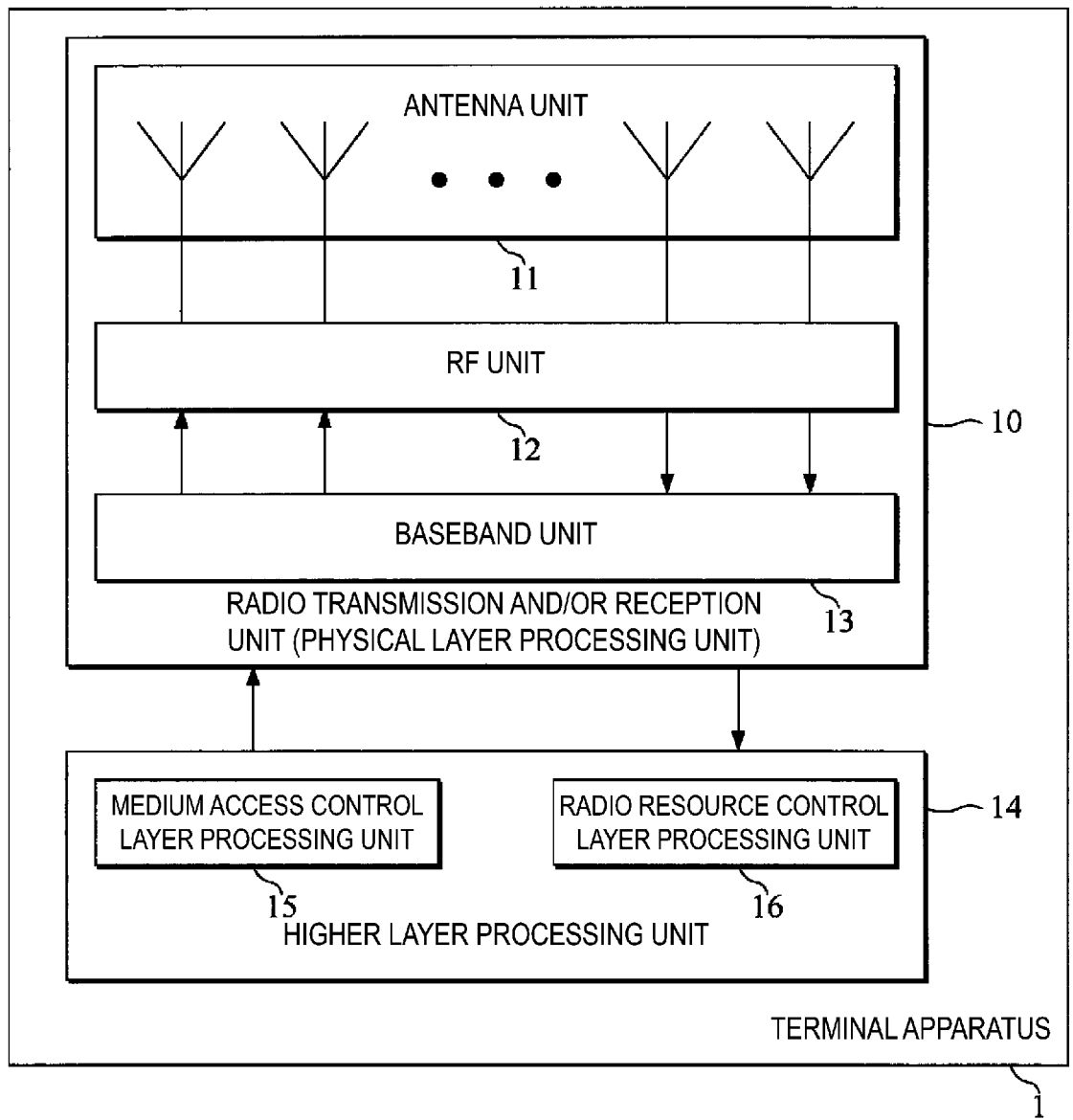
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets the various types of configuration information/parameters based on higher layer signaling received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation, and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
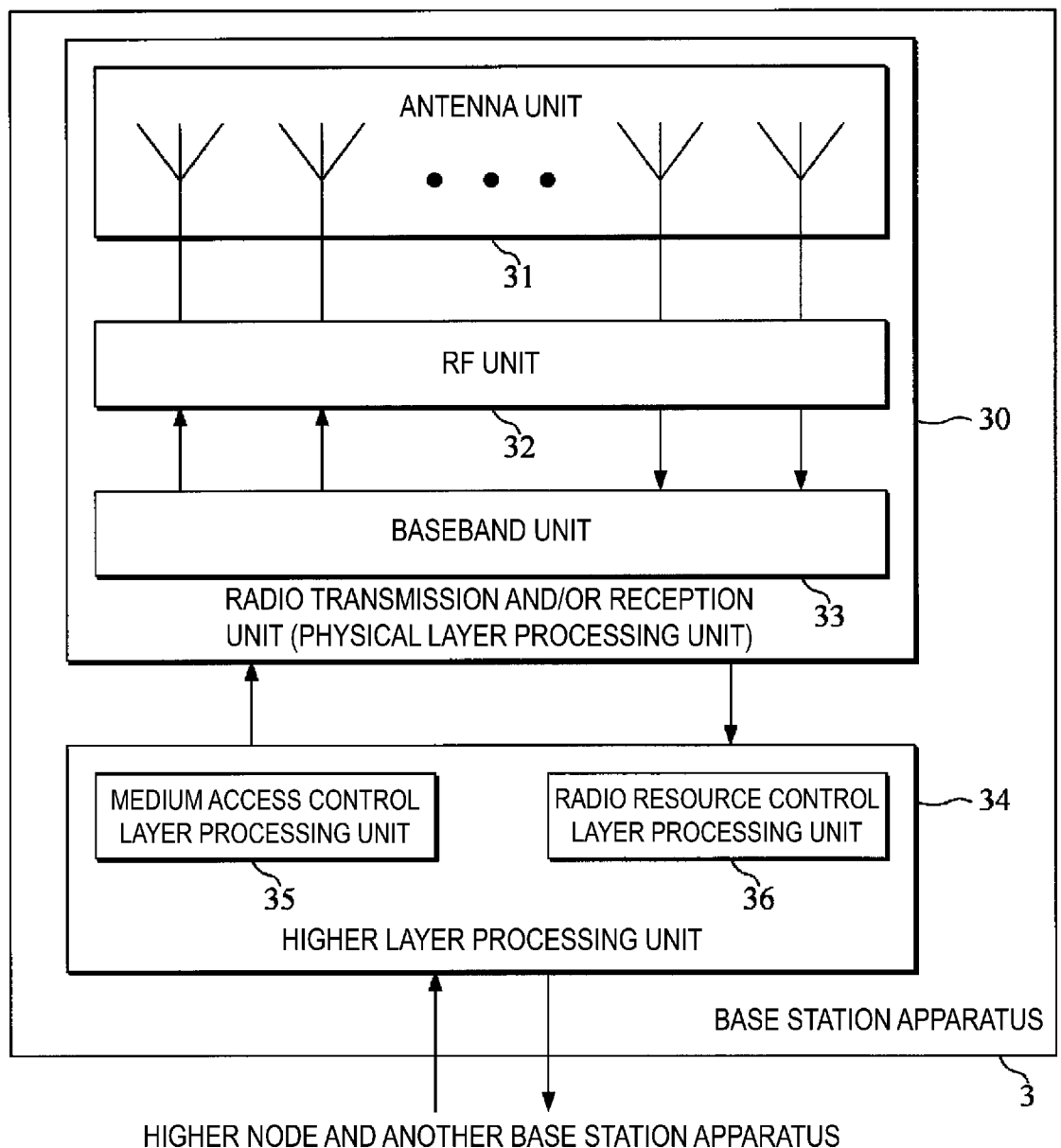
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls random access procedure in accordance with various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set the various types of configuration information/parameters for each of the terminal apparatuses 1 via higher layer signaling. That is, the radio resource control layer processing unit 36 transmits/broadcasts information for indicating the various types of configuration information/parameters.

The functionality of the radio transmission and/or reception unit 30 is similar to the functionality of the radio transmission and/or reception unit 10, and hence description thereof is omitted.

Each of the units that are included in the terminal apparatus 1 and have the reference signs 10 to 16 may be configured as a circuit. Each of the units that are included in the base station apparatus 3 and have the reference signs 30 to 36 may be configured as a circuit. Each of the units that are included in the terminal apparatus 1 and have the reference signs 10 to 16 may be configured as at least one processor and a memory coupled to the at least one processor. Each of the units that are included in the base station apparatus 3 and have the reference signs 30 to 36 may be configured as at least one processor and a memory coupled to the at least one processor.

The DCI format used to schedule the PDSCH in a certain serving cell is also referred to as downlink control information for the certain serving cell. The PDCCH including the DCI format used for scheduling the PDSCH in a certain serving cell is referred to as the PDCCH for the certain serving cell.

The DCI format used for scheduling the PDSCH in the downlink BWP in a certain serving cell is also referred to as downlink control information for the downlink BWP in the certain serving cell or downlink control information for the downlink BWP. The PDCCH including a DCI format used for scheduling the PDSCH in the downlink BWP in a certain serving cell is referred to as the PDCCH for the downlink BWP in the certain serving cell or the PDCCH for the downlink BWP.

A Carrier Indicator Field (CIF) included in the DCI format in the PDCCH received by the terminal apparatus 1 is a field to which a carrier indicator is mapped. The value of the carrier indicator indicates the serving cell corresponding to the DCI format with which the carrier indicator is associated. The value of the carrier indicator is also referred to as CIF value.

The PDCCH for the primary cell is transmitted in the primary cell. The PDCCH for the secondary cell may be transmitted in the primary cell or in that secondary cell or in a secondary cell different from that secondary cell.

The terminal apparatus 1 decodes the PDSCH in the serving cell indicated by the value of the CIF included in the decoded PDCCH based on at least the detection of the PDCCH including the CIF in a certain serving cell.

A downlink Bandwidth Part Index Field (BIF) included in the DCI format in the PDCCH received by the terminal apparatus 1 is a field to which a Bandwidth part Index (BI) is mapped. The value of BI indicates the downlink BWP corresponding to the DCI format with which the BI is associated. The value of BI indicates the downlink BWP in which the PDSCH is scheduled, out of the set of downlink BWPs, included in the serving cell, in which the PDSCH is scheduled according to the DCI format with which the BI is associated.

The terminal apparatus 1 decodes, based on at least the detection of a PDCCH including a downlink Bandwidth part Index Field (BIF) in a certain serving cell, the PDSCH in the downlink BWP, in the serving cell, that is indicated by a value of the downlink BIF included in the PDCCH decoded.

The terminal apparatus 1 decodes, based on at least the detection of a PDCCH including a CIF and a downlink BIF in a certain serving cell, the PDSCHs in the downlink BWPs in the serving cell indicated by a value of the CIF included in the PDCCH decoded and in the serving cell indicated by a value of the downlink BIF.

In a certain serving cell, the terminal apparatus 1 configured to monitor the PDCCH for another serving cell may not monitor a PDCCH in the other serving cell.

In a certain serving cell, the terminal apparatus 1 configured to monitor the PDCCH for another serving cell may monitor, in the certain serving cell, a PDCCH for the certain serving cell.

In a certain serving cell, the terminal apparatus 1 configured to monitor the PDCCH for a certain downlink BWP in the certain serving cell may not monitor the PDCCH in another downlink BWP in the certain serving cell. The terminal apparatus 1 may monitor, at a certain point of time, the PDCCH in one downlink BWP out of a set of downlink BWPs in a certain serving cell. The terminal apparatus 1 may not monitor, at a certain point of time, the PDCCH in multiple downlink BWPs out of a set of downlink BWPs in a certain serving cell.

To monitor a PDCCH including a CIF means that an attempt is made to decode the PDCCH in accordance with a DCI format including the CIF.

To monitor a PDCCH including a downlink BIF means that an attempt is made to decode the PDCCH in accordance with a DCI format including the downlink BIF.

To monitor a PDCCH including a CIF and/or a downlink BIF means that an attempt is made to decode the PDCCH in accordance with a DCI format including the CIF and/or the downlink BIF.

The base station apparatus 3 may transmit, to the terminal apparatus 1 via higher layer signaling, a parameter for indicating whether a DCI format transmitted in the primary cell includes a CIF.

The base station apparatus 3 may transmit, to the terminal apparatus 1 via higher layer signaling, a parameter related to cross-carrier scheduling for each secondary cell.

The parameters related to cross-carrier scheduling include a cell selection parameter for indicating whether the PDCCH corresponding to a secondary cell associated is transmitted in the secondary cell or in another serving cell.

Note that, the higher layer signaling may be any one of Remaining Minimum System Information (RMSI), Other System Information (OSI), a Radio Resource Control (RRC) message, and a Medium Access Control Control Element (MAC CE).

In a case where a cell selection parameter indicates that the PDCCH corresponding to a secondary cell associated is transmitted in the secondary cell, the cell selection parameter includes a parameter indicating whether the CIF is included in the DCI format transmitted in the secondary cell.

In a case where a cell selection parameter indicates that the PDCCH corresponding to a secondary cell associated is transmitted in another serving cell, the cell selection parameter includes a parameter indicating a serving cell in which the DCI format for the secondary cell associated is transmitted.

In a case where a cell selection parameter indicates that the PDCCH corresponding to a secondary cell associated is transmitted in another serving cell, the base station apparatus 3 may transmit, to the terminal apparatus 1, information for indicating a value of the CIF, included in the PDCCH in the other serving cell, that corresponds to the secondary cell.

Figure 6:
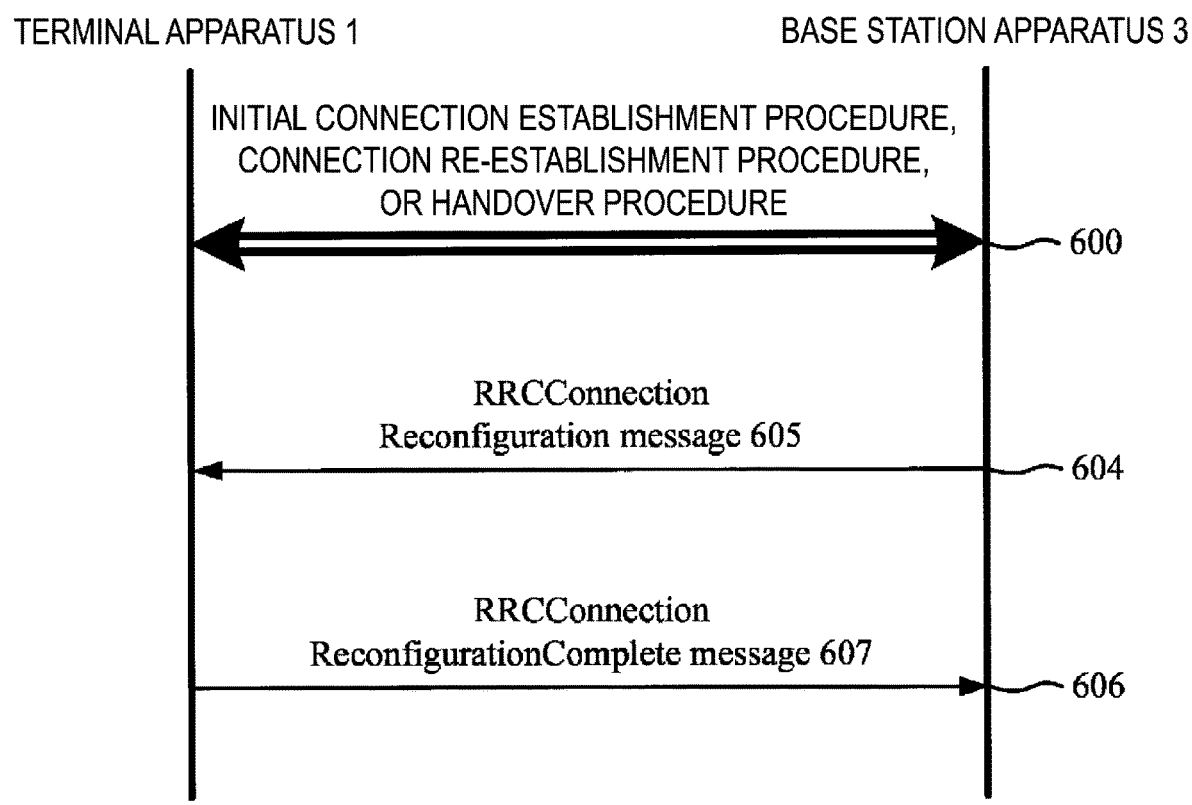
FIG. 6 is a diagram illustrating a sequence chart for a configuration of a serving cell and a downlink BWP.

FIG. 6 is a diagram illustrating a sequence chart for the configuration of the serving cell and the downlink BWP according to the present embodiment.

In 600, the terminal apparatus 1 performs an initial connection establishment procedure, a connection re-establishment procedure, or a handover procedure in the initial downlink BWP in the primary cell. Namely, the terminal apparatus 1 may initiate the initial random access procedure in the initial downlink BWP. Note that, the initial downlink BWP in the primary cell may be determined by the terminal apparatus 1 based on at least system information (for example, RMSI) indicated by a synchronization signal (SS) block detected.

In 604, the terminal apparatus 1 receives the RRCConnectionReconfiguration message 605. The RRCConnectionReconfiguration message 605 may include configuration information of a set of downlink BWPs for the primary cell, a secondary cell, and a set of downlink BWPs for the secondary cell. The terminal apparatus 1 may configure, based on at least the configuration information, the set of downlink BWPs for the primary cell, the secondary cell, and the set of downlink BWPs for the secondary cell.

In 607, the terminal apparatus 1 transmits an RRCConnectionComplete message 607 after the configuration based on the RRCConnectionReconfiguration message 605 is completed.

Hereinafter, the activation of the downlink BWP will be described.

To activate the downlink BWP means that the monitoring of the PDCCH in the downlink BWP is started. To activate the downlink BWP means that the PDSCH may be received in the downlink BWP. For example, in a case that the PDSCH scheduled by the PDCCH decoded in the first downlink BWP corresponds to the second downlink BWP which has been deactivated, the terminal apparatus 1 may receive the PDSCH in the second downlink BWP. Also, to activate the downlink BWP means that the CSI for the downlink BWP may be reported. Further, to activate the downlink BWP means that the HARQ-ACK for the PDSCH in the downlink BWP may be fed back.

At one point of time, at most one downlink BWP may be activated in one serving cell. Namely, multiple downlink BWPs are not simultaneously activated in one serving cell. Namely, the terminal apparatus 1 may not assume that multiple downlink BWPs are simultaneously activated in one serving cell. For example, the terminal apparatus 1 may not assume that PDCCHs are simultaneously monitored in each of the multiple downlink BWPs.

One downlink BWP may always be activated in the primary cell. Namely, in the primary cell, at least one downlink BWP may always be activated. In other words, the primary cell is always activated. All the downlink BWPs may be deactivated in the secondary cell. The serving cell including an activated downlink BWP is also referred to as an activated serving cell. A serving cell not including an activated downlink BWP is also referred to as a deactivated serving cell. A secondary cell including an activated downlink BWP is also referred to as an activated secondary cell. A secondary cell not including an activated downlink BWP is also referred to as a deactivated secondary cell. To activate any downlink BWP in a secondary cell in which no downlink BWP is activated means that the secondary cell is activated. To deactivate all the activated downlink BWPs in the secondary cell may mean that the secondary cell is deactivated.

The initial downlink BWP in the primary cell may be activated until a set of downlink BWPs is configured for the primary cell, for example, until the initial access procedure is completed. Based on at least the set of the downlink BWPs that have been configured for the primary cell, the initial downlink BWP may be deactivated and any one of the set of the downlink BWPs for the primary cell may be activated. The RRCConnectionReconfiguration message 605 may include information for indicating a downlink BWP that is activated based on at least the set of downlink BWPs that have been configured for the primary cell. To deactivate the activated downlink BWP and activate the deactivated downlink BWP means that the downlink BWP to be activated is switched to a downlink BWP other than the existing activated downlink BWP.

At the time when the secondary cell is added, all the downlink BWPs in the secondary cell may be deactivated. The base station apparatus 3 can activate and deactivate the configured secondary cell by transmitting higher layer signaling including activation/deactivation parameters.

Namely, in the secondary cell, the activation/deactivation timing of the secondary cell and the activation/deactivation timing of the downlink BWP in the secondary cell may be different. However, it is preferable that the activation of the downlink BWP in the secondary cell is performed at the same time as the activation of the secondary cell or at a later timing than the activation of the secondary cell.

The higher layer signaling may be RRC (Radio Resource Control) signaling or a MAC CE (Medium Access Control Control Element). Here, the higher layer signaling may be the RRC layer signaling or MAC layer signaling.

The terminal apparatus 1 may activate the configured secondary cell based on at least the reception of an activation/deactivation parameter indicating activation of the configured serving cell. The terminal apparatus 1 may deactivate the configured secondary cell based on at least the reception of an activation/deactivation parameter indicating deactivation of the configured serving cell.

In a case that detection of a PDCCH corresponding to a certain downlink BWP has failed once or a predetermined number of times, or in a case that a time defined for monitoring the PDCCH corresponding to the downlink BWP has elapsed, the activated downlink BWP may be deactivated, and another downlink BWP which is deactivated may be activated. The other downlink BWP is referred to as a default downlink BWP. The downlink BWP other than the default downlink BWP is referred to as a non-default downlink BWP.

Figure 7:
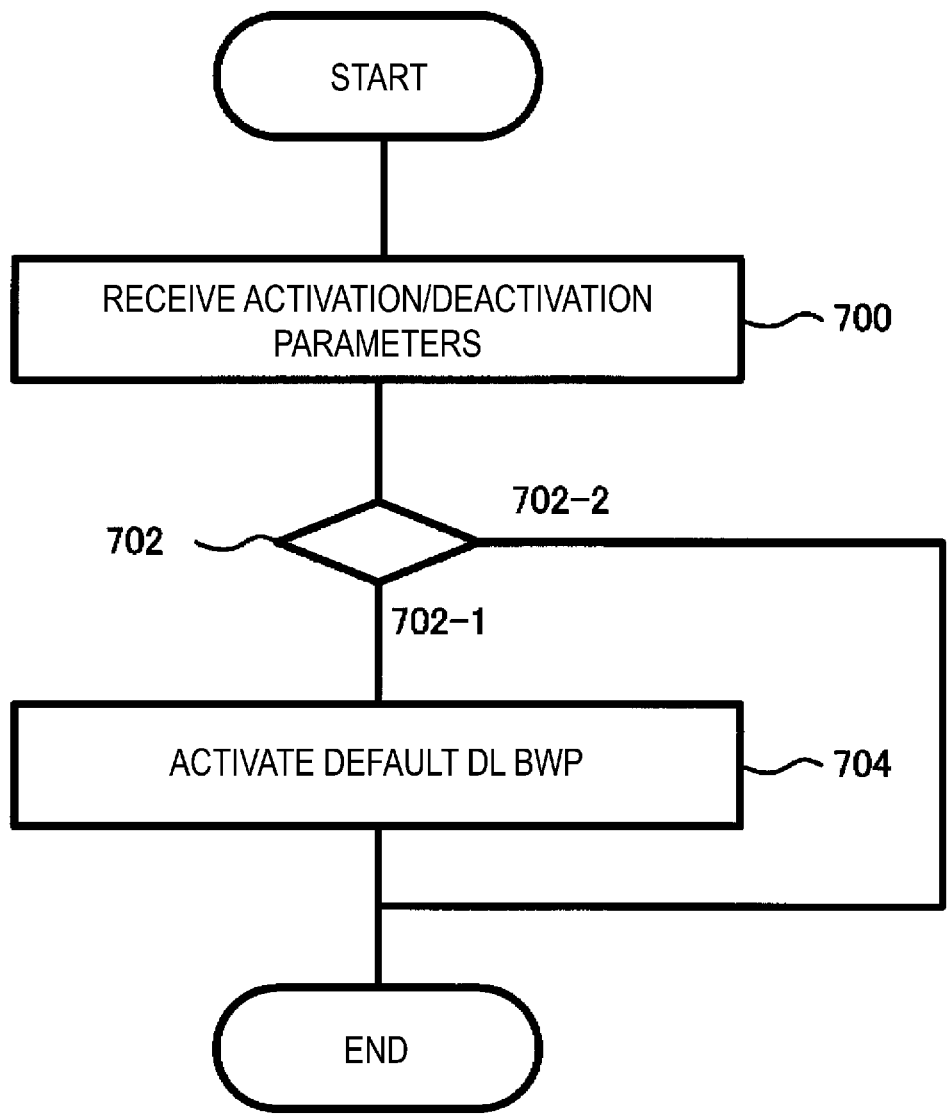
FIG. 7 is a diagram illustrating an example of activation of a secondary cell.

FIG. 7 is a diagram illustrating an example of activation of a secondary cell.

In 700, the terminal apparatus 1 receives an activation/deactivation parameter indicating the activation of the secondary cell.

The set of downlink BWPs for the secondary cell may include one default downlink BWP and one or multiple non-default downlink BWPs. The non-default downlink BWP in the secondary cell is also referred to as a downlink BWP other than the default downlink BWP out of the multiple downlink BWPs in the secondary cell. The RRCConnectionReconfiguration message 605 may include information indicating a default downlink BWP and/or a non-default downlink BWP in the secondary cell.

In 702, the terminal apparatus 1 may determine whether the non-default downlink BWP in the secondary cell is activated.

(702-1) In a case that the non-default downlink BWP in the secondary cell is not activated, the terminal apparatus 1 may activate the default downlink BWP in the secondary cell and terminate the process related to activation of the secondary cell.

(702-2) In a case that the non-default downlink BWP in the secondary cell is activated, the terminal apparatus 1 may terminate the process related to the activation of the secondary cell without activating the default downlink BWP in the secondary cell.

In 702, the terminal apparatus 1 may determine whether any downlink BWP in the secondary cell is activated.

(702-1) In a case that none of the downlink BWPs in the secondary cell is activated, the terminal apparatus 1 may activate the default downlink BWP in the secondary cell and terminate the process related to the activation of the secondary cell.

(702-2) In a case that any one of the downlink BWPs in the secondary cell is activated, the terminal apparatus 1 may terminate the process related to the activation of the secondary cell without activating the default downlink BWP in the secondary cell.

The base station apparatus 3 can switch the downlink BWP to be activated from an existing activated downlink BMP to another downlink BWP by transmitting the downlink control information. An index may be assigned to the downlink BWP. The downlink control information may include downlink BWP index information (BIF) indicating the index of the downlink BWP. The downlink control information may include information indicating a resource allocated for the PDSCH in the downlink BWP indicated by the downlink BIF. The information indicating the resource allocated for the PDSCH in the downlink BWP indicated by the downlink BIF may be mapped to RAF (Resource Allocation Field).

In a case that the terminal apparatus 1 receives the downlink control information including the downlink BIF indicating the deactivated downlink BWP in the serving cell including the activated downlink BWP, the terminal apparatus 1 may switch the downlink BWP to be activated in the serving cell from an existing activated downlink BMP to another downlink BWP indicated by the downlink BIF.

In a case that, in an activated downlink BWP in a certain serving cell, the terminal apparatus 1 receives downlink control information including a downlink BIF indicating a deactivated downlink BWP in the certain serving cell, the terminal apparatus 1 may switch the downlink BWP to be activated in the certain serving cell from an existing activated downlink BMP to another downlink BWP indicated by the downlink BIF.

In an activated downlink BWP in a certain serving cell, the terminal apparatus 1 may not switch, based on at least the reception of the downlink control information including the downlink BIF indicating the deactivated downlink BWP in another serving cell, the downlink BWP to be activated in the certain serving cell.

Figure 8:
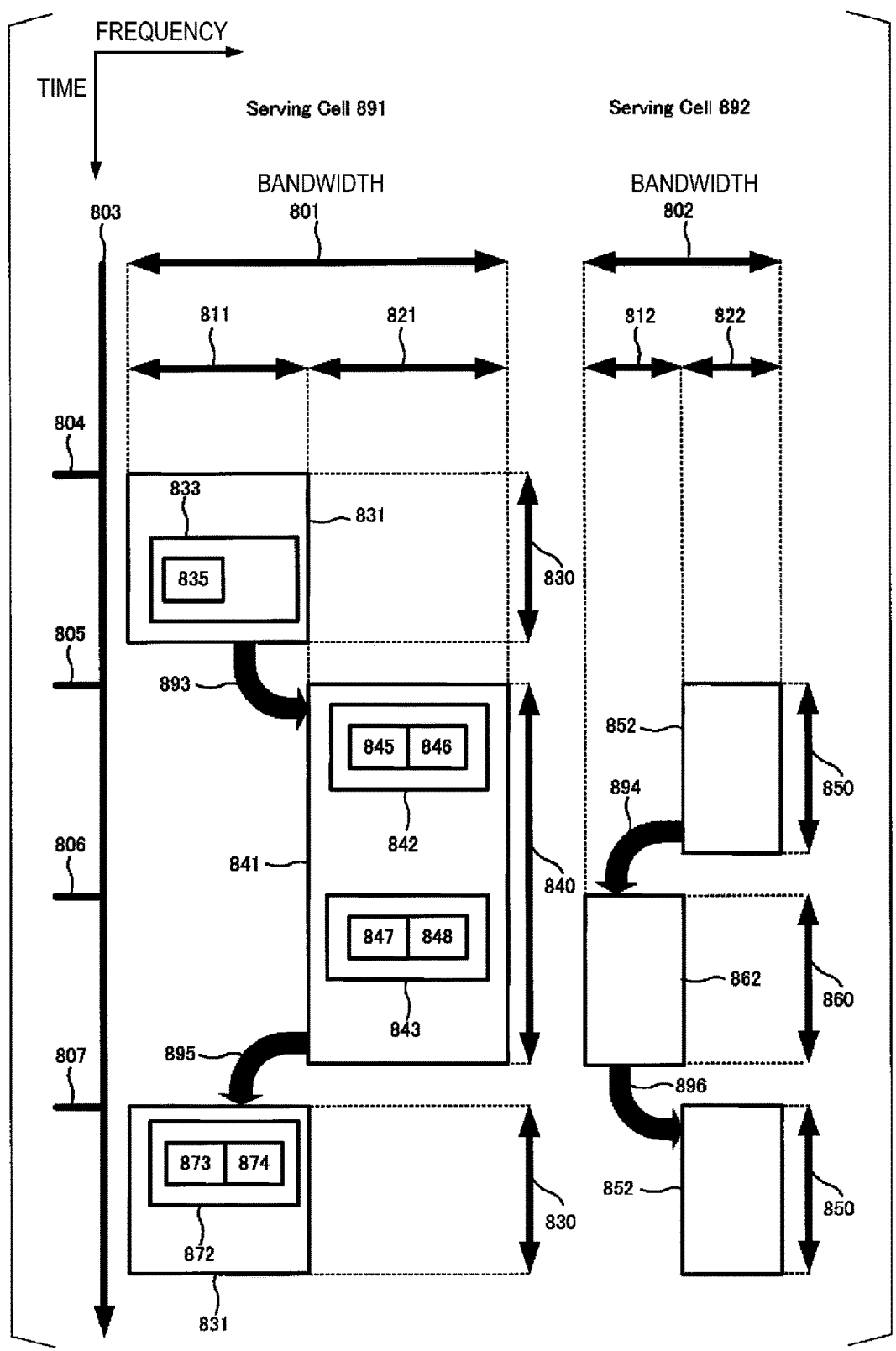
FIG. 8 is a diagram illustrating an example of downlink BWPs for a primary cell and a secondary cell according to the present embodiment.

FIG. 8 is a diagram illustrating an example of activation of the downlink BWP between the serving cells according to the present embodiment.

In FIG. 8, the serving cell 891 may be a primary cell, and the serving cell 892 may be a secondary cell. Also, the serving cell 891 may be a first secondary cell and the serving cell 892 may be a second secondary cell.

The numeral 801 is the bandwidth (downlink bandwidth, transmission bandwidth, channel bandwidth) configured for the serving cell 891. In 801, a downlink BWP 831 and a downlink 841 may be configured. Note that the downlink BWP 831 may be a default downlink BWP. The downlink BWP 841 may be a non-default downlink BWP.

The numeral 802 is the bandwidth (downlink bandwidth, transmission bandwidth, channel bandwidth) configured for the serving cell 892. In 802, a downlink BWP 852 and a downlink BWP 862 may be configured. Note that the downlink BWP 852 may be a default downlink BWP. The downlink BWP 862 may be a non-default downlink BWP.

The numeral 803 denotes a time axis indicating a time at which the terminal apparatus 1 starts activating/deactivating the downlink BWP. The numeral 804 may be a time at which the downlink BWP 831 in the serving cell 891 is activated. Namely, the numeral 804 may be the time at which initial connection configuration is completed. The numeral 805 denotes a time at which the downlink BWP 831 is deactivated and the downlink BWP 841 is activated, and also a time at which the downlink BWP 852 is activated in the serving cell 892. Further, the numeral 806 denotes a time at which the downlink BWP 852 is deactivated and the downlink BWP 862 is activated. In addition, the reference numeral 807 denotes a time at which the downlink BWP 841 is deactivated and the downlink BWP 831 is activated, and also a time at which the downlink BWP 862 is deactivated and the downlink BWP 852 is activated.

The downlink BWP 831 in an initial state may not configure, during the downlink BWP activation period 830 starting from the time 804, a search space for monitoring the PDCCH for the downlink BWP in the serving cell 892.

The numeral 830 denotes a period during which the downlink BWP 831 is activated. The numeral 840 denotes a period during which the downlink BWP 841 is activated. The numeral 850 denotes a period during which the downlink BWP 852 is activated. Further, the numeral 860 denotes a period during which the downlink BWP 862 is activated.

Each of the numerals 833, 842, 843 and 872 denotes a CORESET (Control Resource Set). The terminal apparatus 1 monitors the PDCCH in the CORESET. The numerals 833 and 872 correspond to a first CORESET configuration. The numerals 842 and 843 correspond to a second CORESET configuration. The CORESET configuration may include at least the bandwidth of the CORESET, the number of OFDM symbols constituting the CORESET, and/or the cycle of the CORESET.

The downlink BWP 831 includes the CORESET 833, and the downlink BWP 841 includes the CORESET 842 and the CORESET 843.

In a case that the downlink BWP 831 is activated, the terminal apparatus 1 may monitor the PDCCH in the CORESET 833 corresponding to the first CORESET configuration.

In a case that the downlink BWP 841 is activated, the terminal apparatus 1 may monitor the PDCCH in the CORESET 842 and the CORESET 843 corresponding to the second CORESET configuration.

The CORESET 833 includes a search space 835 for monitoring the PDCCH for scheduling the PDSCH in the downlink BWP 831 or the downlink BWP 841 of the serving cell 891.

The CORESET 842 includes a search space 845 for monitoring the PDCCH for scheduling the PDSCH in the downlink BWP 841 or the downlink BWP 831 of the serving cell 891.

The CORESET 842 includes a search space 846 for monitoring the PDCCH for scheduling the PDSCH in the downlink BWP 852 or the downlink BWP 862 of the serving cell 892.

The CORESET 843 includes a search space 847 for monitoring the PDCCH for scheduling the PDSCH in the downlink BWP 841 or the downlink BWP 831 of the serving cell 891.

The CORESET 843 includes a search space 848 for monitoring the PDCCH for scheduling the PDSCH in the downlink BWP 862 or the downlink BWP 852 of the serving cell 892.

The CORESET 872 includes a search space 873 for monitoring the PDCCH for scheduling the PDSCH in the downlink BWP 831 or the downlink BWP 841 of the serving cell 891.

The CORESET 872 includes a search space 874 for monitoring the PDCCH for scheduling the PDSCH in the downlink BWP 852 or the downlink BWP 862 of the serving cell 892.

During the downlink BWP activation period 830 starting from the time 804 at which the terminal apparatus 1 is in the initial state, the serving cell 892 and/or all of the downlink BWPs in the serving cell 892 may not be activated.

In FIG. 8, based on at least the deactivation state of the downlink BWP 852 and the downlink BWP 862, and the reception of activation/deactivation parameter indicating the activation of the serving cell 892 during the downlink BWP activation period 830, the terminal apparatus 1 may activate the downlink BWP 852 which is a default downlink BWP of the serving cell 892.

In the downlink BWP 831 of the activated serving cell 891, based on at least the detection of the PDCCH that includes the downlink BIF indicating the downlink BWP 852, the terminal apparatus 1 may activate the downlink BWP 852 which is a default downlink BWP of the serving cell 892.

(893) In the search space 835 corresponding to the downlink BWP 831 in the downlink BWP 831 of the serving cell 891 during the downlink BWP activation period 830, based on at least the detection of the PDCCH that includes the downlink BIF indicating the downlink BWP 841, the terminal apparatus 1 may deactivate the activated downlink BWP 831 and activate the deactivated downlink BWP 841.

In the search space 845 corresponding to the downlink BWP 841 in the downlink BWP 841 of the serving cell 891 during the downlink BWP activation period 840, based on at least the detection of the PDCCH that includes the downlink BIF indicating the downlink BWP 841, the terminal apparatus 1 may activate the activated downlink BWP 841.

(894) In the search space 846 corresponding to the downlink BWP 852 in the serving cell 892 in the downlink BWP 841 of the serving cell 891 in the downlink BWP activation period 840, based on at least the detection of the PDCCH that includes the downlink BIF indicating the downlink BWP 862, the terminal apparatus 1 may deactivate the activated downlink BWP 852 and activate the deactivated downlink BWP 862.

(895) In the search space 847 during the downlink BWP activation period 840, based on at least the detection of the PDCCH that includes the downlink BIF indicating the downlink BWP 831, the terminal apparatus 1 may deactivate the activated downlink BWP 841 and activate the deactivated downlink BWP 831.

(895) In the search space 847 during the downlink BWP activation period 840, in a case that the detection of the PDCCH for the downlink BWP 841 has failed once or a predetermined number of times, or a time defined for monitoring the PDCCH for the downlink BWP 841 has elapsed, the terminal apparatus 1 may deactivate the activated downlink BWP 841 and activate the deactivated downlink BWP 831 which is a default downlink BWP.

(896) In the search space 848 during the downlink BWP activation period 840, based on at least the detection of the PDCCH that includes the downlink BIF indicating the downlink BWP 852, the terminal apparatus 1 may deactivate the activated downlink BWP 862 and activate the deactivated downlink BWP 852.

(896) In the search space 848 during the downlink BWP activation period 840, in a case that the detection of the PDCCH for the downlink BWP 862 has failed once or a predetermined number of times, or a time defined for monitoring the PDCCH for the downlink BWP 862 has elapsed, the terminal apparatus 1 may deactivate the activated downlink BWP 862 and activate the deactivated downlink BWP 852 which is a default downlink BWP.

Figure 9:
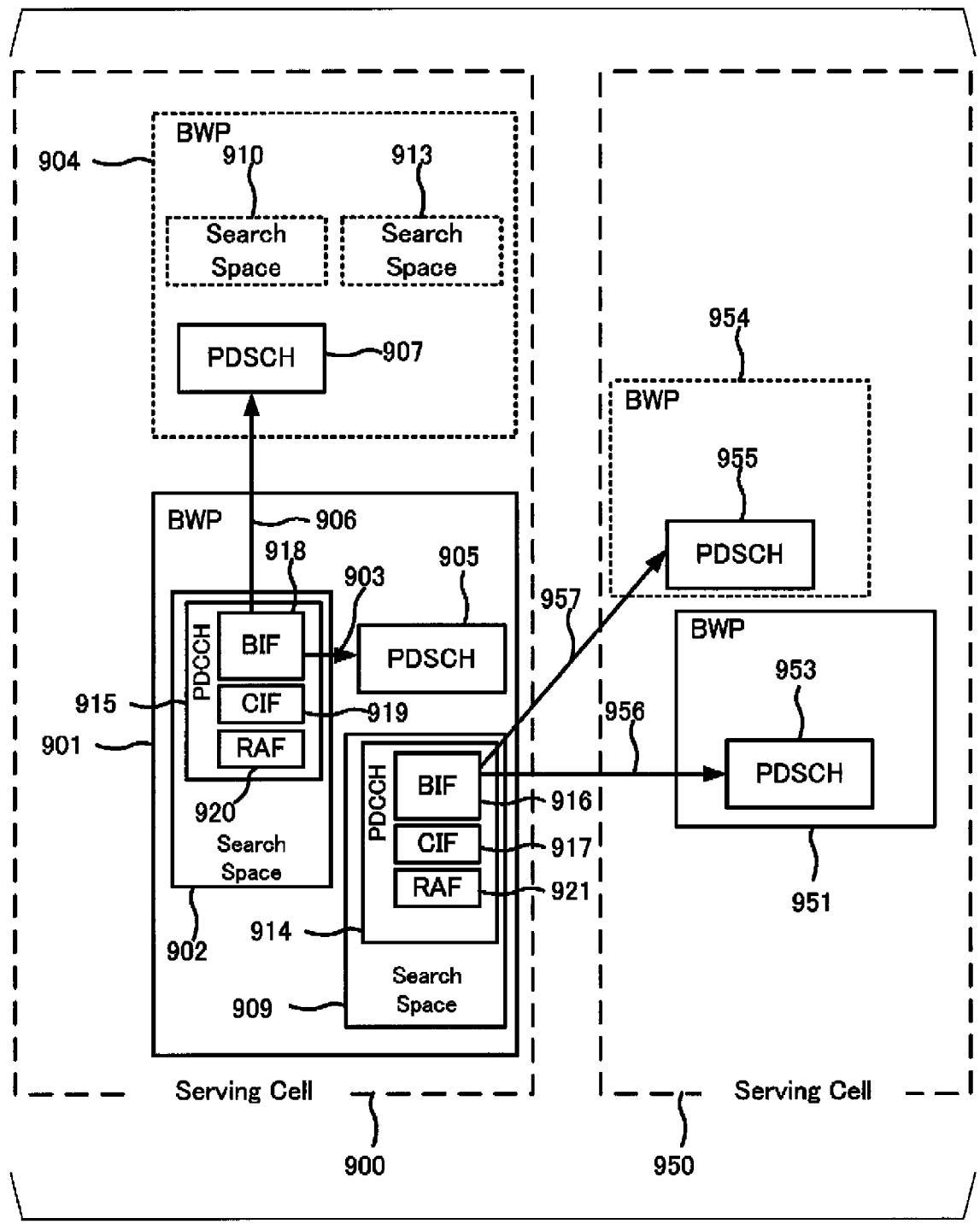
FIG. 9 is a diagram illustrating an example of a PDSCH scheduling between serving cells according to the present embodiment.

FIG. 9 is a diagram illustrating one example of a PDSCH scheduling between serving cells according to the present embodiment.

In FIG. 9, the serving cell 900 may be a primary cell, and the serving cell 950 may be a secondary cell.

The downlink BWP 841 may be the downlink BWP 901.
The downlink BWP 862 may be the downlink BWP 951.
The terminal apparatus 1 attempts to decode, in the search space 902, the PDCCH for scheduling the PDSCH corresponding to any downlink BWP in the serving cell 900, in the activated downlink BWP 901 of the serving cell 900.

(903) In the activated downlink BWP 901 of the serving cell 900, in a case that the value of the downlink BIF 918, included in the PDCCH decoded in the search space 902, corresponds to the activated downlink BWP 901, the terminal apparatus 1 receives, in the downlink BWP 901, the PDSCH 905 based on at least the RAF 920. In the activated downlink BWP 901 of the serving cell 900, in a case that the value of the downlink BIF 918, included in the PDCCH including the CIF 919 set to the value corresponding to the serving cell 900, corresponds to the activated downlink BWP 901, the terminal apparatus 1 receives, in the downlink BWP 901, the PDSCH 905 based on at least the RAF 920. Here, the resources allocated for the PDSCH 905 are given by the RAF 920 included in the PDCCH 915. For example, in the frequency domain, the physical resource block allocated for the PDSCH 905 out of multiple physical resource blocks corresponding to the downlink BWP 901 may be provided by the RAF 920 included in the PDCCH 915.

(906) In the activated downlink BWP 901 of the serving cell 900, in a case that the value of the downlink BIF 918, included in the PDCCH decoded in the search space 902, is the downlink BWP 904 of the deactivated serving cell 900, the terminal apparatus 1 activates the downlink BWP 904 and receives the PDSCH 907 in the activated downlink BWP 904. In the activated downlink BWP 901 of the serving cell 900, in a case that the value of the downlink BIF 918, included in the PDCCH including the CIF 919 set to the value corresponding to the serving cell 900, corresponds to the deactivated downlink BWP 904, the terminal apparatus 1 activates the downlink BWP 904 and receives the PDSCH 907 in the activated downlink BWP 904. Here, the resources allocated for the PDSCH 907 may be provided by the RAF 920 included in the PDCCH 915. For example, in the frequency domain, the physical resource block allocated for the PDSCH 907 out of multiple physical resource blocks corresponding to the downlink BWP 904 may be provided by the RAF 920 included in the PDCCH 915.

The terminal apparatus 1 attempts to decode, in the search space 909, the PDCCH for scheduling the PDSCH corresponding to any downlink BWP in the serving cell 950, in the activated downlink BIF 901 of the serving cell 900.

(956) In the activated downlink BWP 901 of the serving cell 900, in a case that the value of the downlink BIF 916, included in the PDCCH decoded in the search space 909, is the activated downlink BWP 951, the terminal apparatus 1 receives the PDSCH 953 in the downlink BWP 951. In the activated downlink BWP 901 of the serving cell 900, in a case that the value of the downlink BIF 916, included in the PDCCH including the CIF 917 set to the value corresponding to the serving cell 950, corresponds to the activated downlink BWP 951, the terminal apparatus 1 receives the PDSCH 953 in the downlink BWP 951. Here, the resources allocated for the PDSCH 953 may be provided by the RAF 921 included in the PDCCH 914. For example, in the frequency domain, the physical resource block allocated for the PDSCH 953 out of multiple physical resource blocks corresponding to the downlink BWP 951, may be given by the RAF 921 included in the PDCCH 914.

(957) In the activated downlink BWP 901 of the serving cell 900, in a case that the value of the downlink BIF 916, included in the PDCCH decoded in the search space 909, is the deactivated downlink BWP 954, the terminal apparatus 1 activates the downlink BWP 954 and receives the PDSCH 955 in the downlink BWP 954. In the activated downlink BWP 901 of the serving cell 900, in a case that the value of the downlink BIF 916, included in the PDCCH including the CIF 917 set to the value corresponding to the serving cell 950, corresponds to the deactivated downlink BWP 954, the terminal apparatus 1 activates the downlink BWP 954 and receives the PDSCH 955 in the activated downlink BWP 954. Here, the resources allocated for the PDSCH 955 may be provided by the RAF 921 included in the PDCCH 914. For example, in the frequency domain, the physical resource block allocated for the PDSCH 955 out of multiple physical resource blocks corresponding to the downlink BWP 954 may be given by the RAF 921 included in the PDCCH 914.

FIG. 10 is a table illustrating the mapping between a CIF value, a downlink BIF value, a serving cell, and a downlink BWP according to the present embodiment. For example, in a case that the PDCCH including the CIF set to 0 and the downlink BIF set to 0 is detected, and the downlink BWP 901 in the serving cell 900 is activated, the terminal apparatus 1 receives the PDSCH in the activated downlink BWP 901. In a case that the PDCCH including the CIF set to 0 and the downlink BIF set to 0 is detected and the downlink 901 in the serving cell 900 is deactivated, the downlink BWP 901 is activated and the PDSCH is received in the downlink BWP 901.

The search space for the downlink BWP in each serving cell may be given based on at least the value of the CIF. Also, the search space for the downlink BWP in each serving cell may be given regardless of the value of the downlink BIF.

The search space to which the PDCCH for scheduling the PDSCH is mapped may be configured based on at least the value of the CIF for indicating each serving cell. The search space to which the PDCCH for scheduling the PDSCH is mapped may be configured regardless of the value of the downlink BIF for indicating each downlink BWP. In addition, the number of PDCCH candidates that attempt to receive the PDCCH in the search space corresponding to each serving cell may be given for each serving cell indicated by the value of the CIF.

In a case that a secondary cell is added and activated for the terminal apparatus 1, the terminal apparatus 1 starts monitoring the PDCCH in the search space corresponding to the value of the CIF that corresponds to the secondary cell that is added and activated. Namely, in a case that the secondary cell is added and activated to the terminal apparatus 1, PDCCH candidates in which the terminal apparatus 1 monitors the PDCCH increase. For example, based on the addition and activation of the serving cell 950, the terminal apparatus 1 may start monitoring the PDCCH in the search space 909.

In a case that a downlink BWP is added to a serving cell already configured, the terminal apparatus 1 starts monitoring the PDCCH in the search space for the serving cell already configured. Namely, even if the downlink BWP is added to the terminal apparatus 1, the number of PDCCH candidates in which the terminal apparatus 1 monitors the PDCCH does not increase. For example, in a case that the downlink BWP 901 is already configured, and the downlink BWP 904 is added, the terminal apparatus 1 may start monitoring the PDCCH for the downlink BWP 904 in the search space 902 in which the terminal apparatus 1 has been monitoring the PDCCH for the downlink BWP 901.

The PDCCH for the BWP 901 and the PDCCH for the BWP 904 may be mapped to the PDCCH candidates included in the search space 902. The PDCCH for the BWP 951 and the PDCCH for the BWP 954 may be mapped to the PDCCH candidates included in the search space 909.

The size of the downlink control information for the BWP 901 may be the same as the size of the downlink control information for the BWP 904. The size of the downlink control information for the BWP 951 may be the same as the size of the downlink control information for the BWP 954.

The size of the downlink control information for the downlink BWP 901 and the size of the downlink control information for the downlink BWP 904 are also referred to as the size of downlink control information corresponding to the CIF set to 0. The size of the downlink control information for the BWP 951 and the size of the downlink control information for the BWP 954 are also referred to as the size of the downlink control information corresponding to the CIF set to 1.

The downlink control information corresponding to the CIF set to 0 includes downlink control information for the downlink BWP 901 and downlink control information for the downlink BWP 904.

The downlink control information corresponding to the CIF set to 1 includes the downlink control information for the BWP 951 and the downlink control information for the BWP 954.

In a case that the size of the downlink control information corresponding to the CIF set to 0 is the same as the size of the downlink control information corresponding to the CIF set to 1, the PDCCH including the downlink control information for the downlink BWP 901 and the PDCCH including the downlink control information for the downlink BWP 904 may be mapped to the search space 909. In a case that the size of the downlink control information corresponding to the CIF set to 0 is different from the size of the downlink control information corresponding to the CIF set to 1, the PDCCH including the downlink control information for the downlink WP 901 and the PDCCH including the downlink control information for the downlink BWP 904 are not mapped to the search space 909.

In a case that the size of the downlink control information corresponding to the CIF set to 0 is the same as the size of the downlink control information corresponding to the CIF set to 1, the PDCCH including the downlink control information for the BWP 951 and the PDCCH including the downlink control information for the BWP 954 may be mapped to the search space 902. In a case that the size of the downlink control information corresponding to the CIF set to 0 is different from the size of the downlink control information corresponding to the CIF set to 1, the PDCCH including the downlink control information for the BWP 951 and the PDCCH including the downlink control information for the BWP 954 are not mapped to the search space 902.

The terminal apparatus 1 may not monitor the PDCCH in the search spaces 910 and 913 of the deactivated downlink BWP.

The CCE index corresponding to the search space 902 and the search space 909 may be given based on at least the value of the CIF.

The configuration of CORESET will be described below.

Figure 11:
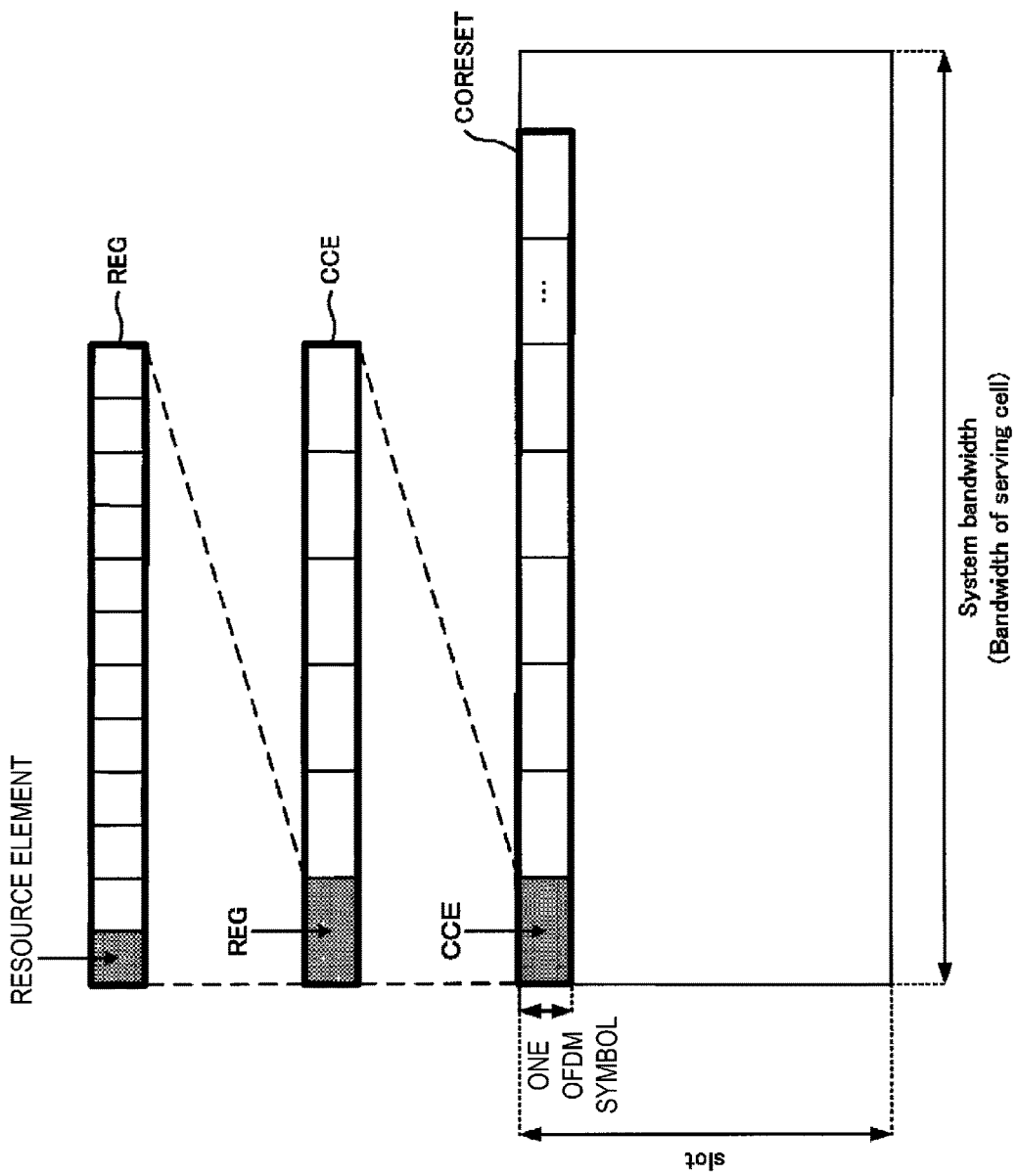
FIG. 11 is a diagram illustrating an example of CORESET according to the present embodiment.

FIG. 11 is a diagram illustrating an example of a CORESET according to the present embodiment. In the time domain, the CORESET may be included in the first OFDM symbol of the slot. The CORESET may include multiple resource elements contiguous in the frequency domain. The CORESET may include multiple CCEs. One CCE may include six contiguous REGs in the frequency domain. One REG may include 12 contiguous resource elements in the frequency domain.

Figure 12:
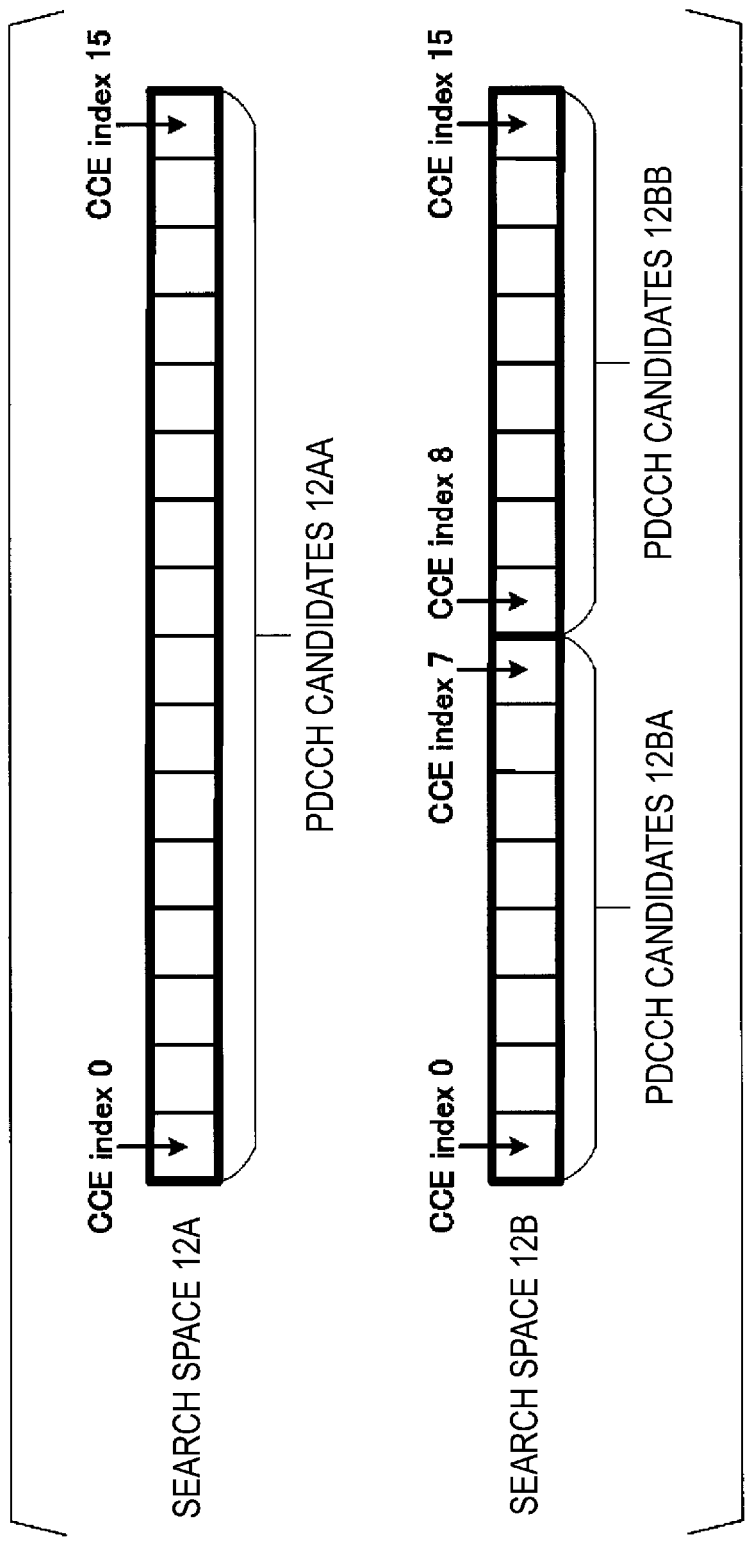
FIG. 12 is a diagram illustrating an example of search spaces according to the present embodiment.

FIG. 12 is a diagram illustrating an example of a search space according to the present embodiment. The search space is a set of PDCCH candidates. The PDCCH is transmitted in the PDCCH candidate. The terminal apparatus 1 attempts to decode the PDCCH in the search space. The PDCCH candidate may include one or multiple consecutive CCEs. The number of CCEs constituting the PDCCH candidate is also referred to as an aggregation level. The search space may be defined for each aggregation level. The search space 12A includes PDCCH candidate 12AA having an aggregation level of 16. The search space 12B includes PDCCH candidates 12BA and 12BB, each having an aggregation level of 8.

The terminal apparatus 1 monitors a set of PDCCH candidates in one slot of the serving cell. The terminal apparatus 1 may not monitor all the PDCCH candidates in one slot of the serving cell. Here, monitoring means that decoding of each of the PDCCHs in the set of the PDCCH candidates is attempted according to the DCI format to be monitored.

The base station apparatus 3 selects the PDCCH candidate to be used for transmitting the PDCCH to the terminal apparatus 1 out of the set of PDCCH candidates, in one slot of the serving cell, that are monitored by the terminal apparatus 1.

The set of PDCCH candidates to be monitored is referred to as a search space. Multiple search spaces include multiple CSSs (Common Search Spaces) and multiple USSs (User equipment-specific Search Spaces). The multiple CSSs include multiple CSSs. The multiple USSs include multiple USSs. One USS is a set including multiple PDCCH candidates.

The PDCCH candidates included in the same CSS each include the same number of CCEs (Control Channel Elements). The PDCCH candidates included in the same USS each include the same number of CCEs. The number of CCEs constituting the PDCCH candidate is referred to as an Aggregation Level L. The CCE includes multiple resource elements included in the PDCCH region. The USS is defined for each aggregation level.

For each serving cell in which the PDCCH is monitored, one or multiple CCEs corresponding to the PDCCH candidates m included in USS $S_{p,\ k}^{(L)}$ corresponding to the aggregation level L in slot k may be given by Equation (1) and Equation (2).

$$L\left\{\left(Y_{p,k} + \text{floor}\left(\frac{m \cdot N_{CCE,p,k}}{L \cdot M_p^{(L)}}\right) + b\right) \bmod \text{floor}\left(\frac{N_{CCE,p,k}}{L}\right)\right\} + i \qquad \text{Equation 1}$$

where $i = 0, 1, \ldots, L-1$ and $m = 0, 1, \ldots, M_p^{(L)} - 1$ $$Y_{p,k} = (A_p \cdot Y_{p,k}) \bmod D \qquad \text{Equation 2}$$

where $Y_{p,-1} = n_{RNTI} \neq 0, A_0 = 39827, A_1 = 39829, D = 65537$

Here, X mod Y is a function that returns a remainder acquired by dividing X by Y, floor is a function that returns a value acquired by truncating the decimal places of the input value, $N_{CCE,\ p,\ k}$ is the total number of CCEs included in a CORESET p in the slot k, m is the index of a PDCCH candidate included in the USS $S_{p,\ k}^{(L)}$, b is a CIF value, $M_p^{(L)}$ is the number of PDCCH candidates monitored in the USS $S_{p,\ k}^{(L)}$, and the USS $S_{p,\ k}^{(L)}$ is defined for each CIF value. The terminal apparatus 1 monitors the USS $S_{p,\ k}^{(L)}$ corresponding to a value to which the CIF included in the DCI format to be monitored can be set. $n_{RNTI}$ may be a value of an RNTI. According to the present embodiment, $n_{RNTI}$ may be a value of a C-RNTI.

$M_p^{(L)}$ may be given based on at least the aggregation level L, the number of PRBs included in the CORESET p, and the number of CORESETs configured in one slot in the serving cell, and the like.

Figure 13:
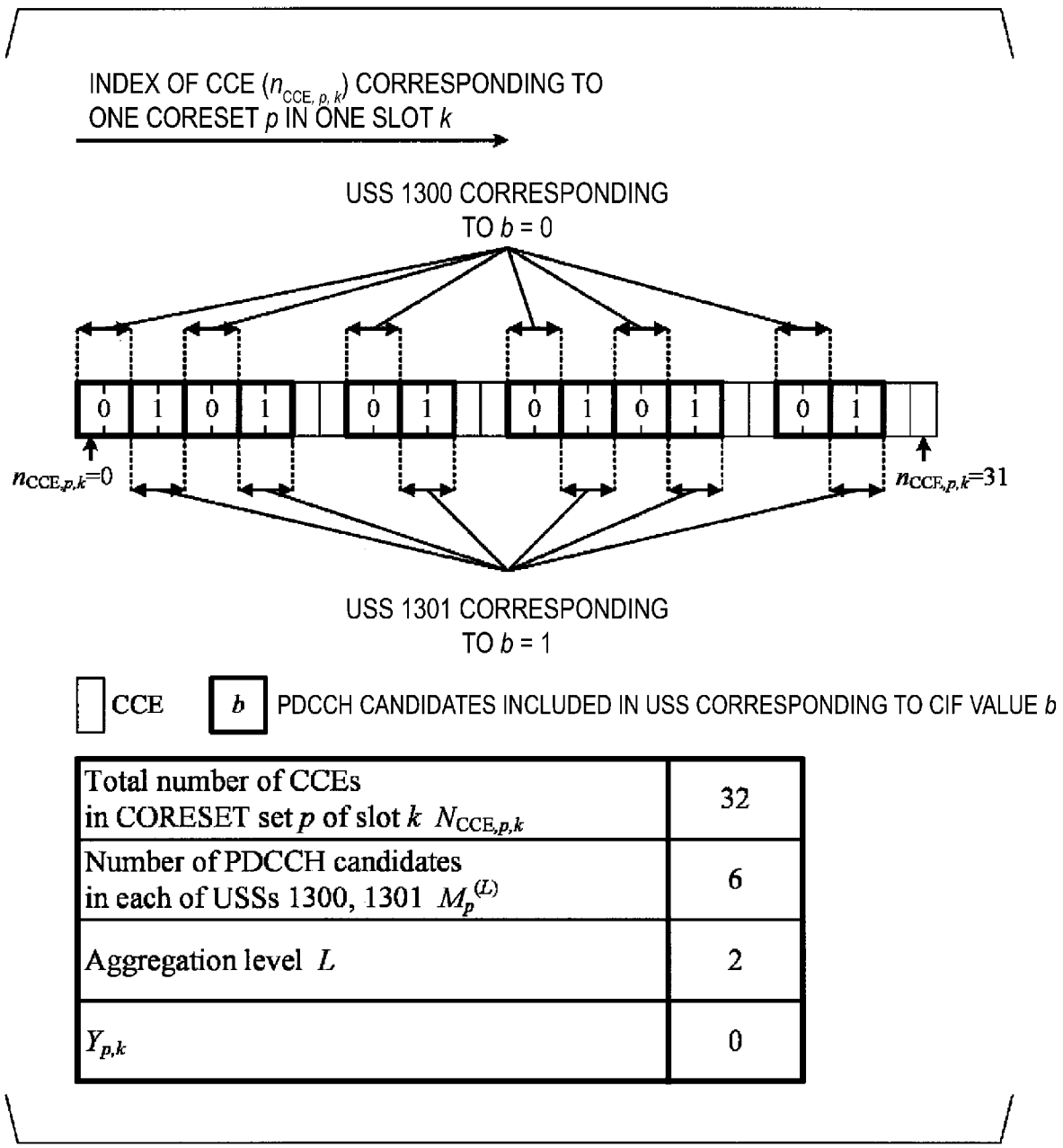
FIG. 13 is a diagram illustrating an example of a USS in one CORESET p in one slot k of one serving cell according to the present embodiment.

FIG. 13 is a diagram illustrating an example of USS in one CORESET p in one slot k of one serving cell according to the present embodiment. The USS in FIG. 13 is given by Equation (1) and Equation (2). In FIG. 13, the horizontal axis represents the index $n_{CCE,\ p,\ k}$ of a CCE included in one CORESET p in one slot k of one serving cell. FIG. 13 includes a USS 1300 corresponding to the CIF value 0 and a USS 1301 corresponding to the CIF value 1. The bold square marked with b denotes a PDCCH candidate included in the USS corresponding to the CIF value b. In FIG. 13, $N_{CCE,\ p,\ k}$ is 32, L is 2, and $Y_{p,\ k}$ is 0. In FIG. 13, $M_p^{(L)}$ is 6 for each of the USS 1300 and USS 1301.

In FIG. 13, a PDCCH candidate m=x included in the USS corresponding to a certain CIF value is adjacent to another PDCCH candidate m=x included in the USS corresponding to another CIF value greater than the certain CIF value by one.

In a case that the terminal apparatus 1 is not configured to monitor the PDCCH including the CIF in the serving cell, the value of m in Equation (1) may be 0.

Hereinafter, various aspects of the terminal apparatus 1 and the base station apparatus 3 according to the present embodiment will be described.

(1) A first aspect of the present embodiment is a terminal apparatus, including a receiver configured to receive a first PDCCH including first downlink control information for scheduling a first PDSCH in any one of one or multiple downlink BWPs included in a band of a first serving cell, and receive a second PDCCH including second downlink control information for scheduling a second PDSCH in any one of one or multiple downlink BWPs included in a band of a second serving cell, wherein the first PDCCH is mapped to a first search space in the first serving cell, and the second PDCCH is mapped to a second search space in the first serving cell. For example, the PDSCH 905 in the activated downlink BWP 901 of the serving cell 900 is mapped to the search space 902 in the serving cell 900, and the PDSCH 953 in the activated downlink BWP 951 of the serving cell 950 is mapped to the search space 909 in the serving cell 900.

(2) In the first aspect of the present embodiment, the first search space is a first set of PDCCH candidates in which decoding of the first PDCCH is attempted, and the second search space is a second set of PDCCH candidates in which decoding of the second PDCCH is attempted. For example, a CCE corresponding to the activated downlink BWP of the primary cell that corresponds to the value b of CIF 919 being 0 may be different from a CCE corresponding to the activated downlink BWP of the secondary cell that corresponds to the value b of CIF 917 being 1.

(3) In the first aspect of the present embodiment, a CCE corresponding to one of the first set of PDCCH candidates of the first search space is provided based on at least a first value of a CIF, a CCE corresponding to one of the second set of PDCCH candidates of the second search space is provided based on at least a second value of the CIF, the first downlink control information includes the CIF set to the first value, and the second downlink control information includes the CIF set to the second value.

(4) In the first aspect of the present embodiment, a receiver is provided that is configured to receive a first PDCCH including a downlink BIF set to a value corresponding to a downlink BWP belonging to a first set of downlink BWPs and receive a second PDCCH including a downlink BIF set to a value corresponding to a downlink BWP belonging to a second set of downlink BWPs, wherein the first PDCCH is mapped to a first search space included in a first serving cell and the second PDCCH is mapped to a second search space included in the first serving cell.

(5) In the first aspect of the present embodiment, a carrier indicator field (CIF) included in the first PDCCH is set to a first value, and the CIF included in the second PDCCH is set to a second value.

(6) In the first aspect of the present embodiment, the receiver is configured to receive, in a case that the first PDCCH is detected, a first PDSCH in the downlink BWP corresponding to the value set for the downlink BIF included in the first PDCCH, and receive, in a case in which the second PDCCH is detected, a second PDSCH in the downlink BWP corresponding to the value set for the downlink BIF included in the second PDCCH, a band allocated for the first PDSCH is provided based on at least a Resource Allocation Field (RAF) included in the first PDCCH, and a band allocated for the second PDSCH is provided based on at least a Resource Allocation Field (RAF) included in the second PDCCH.

(7) A second aspect of the present embodiment is a base station apparatus, the base station apparatus including a transmitter configured to transmit a first PDCCH including first downlink control information for scheduling a first PDSCH in any one of one or multiple downlink BWPs included in a band of a first serving cell, and transmit a second PDCCH including second downlink control information for scheduling a second PDSCH in any one of one or multiple downlink BWPs included in a band of a second serving cell, wherein the first PDCCH is mapped to a first search space in the first serving cell, and the second PDCCH is mapped to a second search space in the first serving cell.

(8) In the second aspect of the present embodiment, the first search space is a first set of PDCCH candidates in which decoding of the first PDCCH is attempted, and the second search space is a second set of PDCCH candidates in which decoding of the second PDCCH is attempted.

(9) In a second aspect of the embodiment, a CCE corresponding to one of the first set of PDCCH candidates of the first search space is provided based on at least a first value of a CIF, a CCE corresponding to one of the second set of PDCCH candidates of the second search space is provided based on at least a second value of the CIF, the first downlink control information includes the CIF set to the first value, and the second downlink control information includes the CIF set to the second value.

(10) In the second aspect of the present embodiment, a transmitter is provided that is configured to transmit a first PDCCH including a downlink BIF set to a value corresponding to a downlink BWP belonging to a first set of downlink BWPs and transmit a second PDCCH including a downlink BIF set to a value corresponding to a downlink BWP belonging to a second set of downlink BWPs, wherein the first PDCCH is mapped to a first search space included in a first serving cell and the second PDCCH is mapped to a second search space included in the first serving cell.

(11) In the second aspect of the present embodiment, a carrier indicator field (CIF) included in the first PDCCH is set to a first value, and the CIF included in the second PDCCH is set to a second value.

(12) In the second aspect of the present embodiment, the transmitter is configured to transmit, in a case that the first PDCCH is detected, a first PDSCH in the downlink BWP corresponding to the value set to the downlink BIF included in the first PDCCH, and transmit, in a case that the second PDCCH is detected, a second PDSCH in the downlink BWP corresponding to the value set to the downlink BIF included in the second PDCCH, wherein a band allocated for the first PDSCH is provided based on at least a Resource Allocation Field (RAF) included in the first PDCCH, and a band allocated for the second PDSCH is provided based on at least a Resource Allocation Field (RAF) included in the second PDCCH.

This allows the terminal apparatus 1 and the base station apparatus 3 to efficiently perform the downlink transmission and reception.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these apparatuses is temporarily accumulated in a Random Access Memory (RAM) while being processed, and thereafter, the information is stored in various types of Read Only Memory (ROM) such as a flash ROM and a Hard Disk Drive (HDD), and read by the CPU to be modified or rewritten, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration that allows constituent elements, described in the respective embodiments and having mutually the same effects, to be substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
a reception circuitry configured to:
receive a first Physical Downlink Control Channel (PDCCH) including a first downlink Bandwidth part Index Field (BIF) based on a first PDCCH candidate in a first search space in a first serving cell; and
receive a second PDCCH including a second downlink BIF based on a second PDCCH candidate in a second search space in the first serving cell; and
a higher layer processing unit configured to:
activate a first downlink bandwidth part (BWP) of a first set of downlink BWPs in the first serving cell based on information indicated by the first downlink BIF; and
activate a second downlink BWP of a second set of downlink BWPs in a second serving cell based on information indicated by the second downlink BIF, wherein:
after receiving the first PDCCH, the reception circuitry is further configured to receive a first Physical down-link Shared Channel (PDSCH) in the first downlink BWP based on the information indicated by the first downlink BIF included in the first PDCCH,
after receiving the second PDCCH, the reception circuitry is further configured to receive a second PDSCH in the second downlink BWP based on the information indicated by the second downlink BIF included in the second PDCCH,
a band allocated for the first PDSCH is provided based on at least a first Resource Allocation Field (RAF) included in the first PDCCH, and
a band allocated for the second PDSCH is provided based on at least a second RAF included in the second PDCCH.

2. The terminal apparatus according to claim 1, wherein a first carrier indicator field (CIF) included in the first PDCCH is set to a first value, and a second CIF included in the second PDCCH is set to a second value.

3. A base station apparatus comprising:
a transmission circuitry configured to:
transmit a first Physical Downlink Control Channel (PDCCH) including a first downlink Bandwidth part Index Field (BIF) based on a first PDCCH candidate in a first search space in a first serving cell; and
transmit a second PDCCH including a second downlink BIF based on a second PDCCH candidate in a second search space in the first serving cell; and
a higher layer processing unit configured to:
activate a first downlink bandwidth part (BWP) of a first set of downlink BWPs in the first serving cell based on information indicated by the first downlink BIF; and
activate a second downlink BWP of a second set of downlink BWPs in a second serving cell based on information indicated by the second downlink BIF, wherein:
after transmitting the first PDCCH, the transmission circuitry is further configured to transmit a first Physical Downlink Shared Channel (PDSCH) in the first downlink BWP corresponding to the information indicated by the first downlink BIF included in the first PDCCH,
after transmitting the second PDCCH, the transmission circuitry is further configured to transmit a second PDSCH in the second downlink BWP corresponding to the information indicated by the second downlink BIF included in the second PDCCH,
a band allocated for the first PDSCH is provided based on at least a first Resource Allocation Field (RAF) included in the first PDCCH, and
a band allocated for the second PDSCH is provided based on at least a second RAF included in the second PDCCH.

4. The base station apparatus according to claim 3, wherein a first carrier indicator field (CIF) included in the first PDCCH is set to a first value, and a second CIF included in the second PDCCH is set to a second value.

5. A communication method used for a terminal apparatus, the communication method comprising:
receiving a first Physical Downlink Control Channel (PDCCH) including a first downlink Bandwidth part Index Field (BIF) based on a first PDCCH candidate in a first search space in a first serving cell;
receiving a second PDCCH including a second downlink BIF based on a second PDCCH candidate in a second search space in the first serving cell;

activating a first downlink bandwidth part (BWP) of a first set of downlink BWPs in the first serving cell based on information indicated by the first downlink BIF;

activating a second downlink BWP of a second set of downlink BWPs in a second serving cell based on information indicated by the second downlink BIF;

after receiving the first PDCCH, receiving a first Physical downlink Shared Channel (PDSCH) in the first downlink BWP based on the information indicated by the first downlink BIF included in the first PDCCH; and after receiving the second PDCCH, receiving a second PDSCH in the second downlink BWP based on the information indicated by the second downlink BIF included in the second PDCCH, wherein:

a band allocated for the first PDSCH is provided based on at least a first Resource Allocation Field (RAF) included in the first PDCCH, and a band allocated for the second PDSCH is provided based on at least a second RAF included in the second PDCCH.

6. A communication method used for a base station apparatus, the communication method comprising:

transmitting a first Physical Downlink Control Channel (PDCCH) including a first downlink Bandwidth part Index Field (BIF) based on a first PDCCH candidate in a first search space in a first serving cell;

transmitting a second PDCCH including a second downlink BIF based on a second PDCCH candidate in a second search space in the first serving cell;

activating a first downlink bandwidth part (BWP) of a first set of downlink BWPs in the first serving cell based on information indicated by the first downlink BIF;

activating a second downlink BWP of a second set of downlink BWPs in a second serving cell based on information indicated by the second downlink BIF;

after transmitting the first PDCCH, transmitting a first Physical Downlink Shared Channel (PDSCH) in the first downlink BWP corresponding to the information indicated by the first downlink BIF included in the first PDCCH; and after transmitting the second PDCCH, transmitting a second PDSCH in the second downlink BWP corresponding to the information indicated by the second downlink BIF included in the second PDCCH, wherein:

a band allocated for the first PDSCH is provided based on at least a first Resource Allocation Field (RAF) included in the first PDCCH, and a band allocated for the second PDSCH is provided based on at least a second RAF included in the second PDCCH.

* * * * *